United States Patent
Starner et al.

(10) Patent No.: US 11,294,511 B2
(45) Date of Patent: *Apr. 5, 2022

(54) DETECTING TWIST INPUT WITH AN INTERACTIVE CORD

(71) Applicant: Google LLC, Mountain View, CA (US)

(72) Inventors: Thad Eugene Starner, Atlanta, GA (US); Karissa A. Sawyer, Santa Clara, CA (US); Greg Ellis Priest-Dorman, Berkeley, CA (US); Jonathan Moeller, Mountain View, CA (US); Nidhi Rathi, Mountain View, CA (US); Jianyi Liu, Santa Clara, CA (US); Yao Ding, San Jose, CA (US); Chi Kin Benjamin Leung, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 285 days.

This patent is subject to a terminal disclaimer.

(21) Appl. No.: 16/549,358

(22) Filed: Aug. 23, 2019

(65) Prior Publication Data
US 2019/0377440 A1 Dec. 12, 2019

Related U.S. Application Data

(63) Continuation of application No. 15/352,411, filed on Nov. 15, 2016, now Pat. No. 10,402,020.

(51) Int. Cl.
*G06F 3/044* (2006.01)
*G06F 3/041* (2006.01)
(Continued)

(52) U.S. Cl.
CPC ............ *G06F 3/044* (2013.01); *G06F 3/0416* (2013.01); *G06F 3/165* (2013.01); *H04R 1/1033* (2013.01);
(Continued)

(58) Field of Classification Search
CPC ........ G06F 3/044; G06F 3/0416; G06F 3/165; G06F 2203/04102; G06F 3/017;
(Continued)

(56) References Cited

U.S. PATENT DOCUMENTS

| 4,648,054 A | 3/1987 | Farah et al. |
| 6,852,395 B2 | 2/2005 | Dhawan et al. |

(Continued)

FOREIGN PATENT DOCUMENTS

| JP | 2010092317 A | * 4/2010 |
| WO | 2015144597 | 1/2016 |

OTHER PUBLICATIONS

"First Action Interview Office Action", U.S. Appl. No. 15/418,432, dated May 16, 2018, 5 pages.
(Continued)

*Primary Examiner* — Pinping Sun
(74) *Attorney, Agent, or Firm* — Colby Nipper PLLC

(57) ABSTRACT

This document describes techniques and devices for detecting twist input with an interactive cord. An interactive cord may be constructed with one or more conductive yarns wrapped around a cable in a first direction (e.g., clockwise), and one or more conductive yarns wrapped around the cable in a second direction that is opposite the first direction (e.g., counter-clockwise). A controller measures one or more capacitance values associated with the conductive yarns. In response to detecting a change in the one or more capacitance values, the controller determines that the change in the capacitance values corresponds to twist input caused by the user twisting the interactive cord. Then, the controller initiates one or more functions based on the twist input, such as by controlling audio to a headset by increasing or decreasing the volume, scrolling through menu items, and so forth.

20 Claims, 18 Drawing Sheets

(51) Int. Cl.
*G06F 3/16* (2006.01)
*H04R 1/10* (2006.01)

(52) U.S. Cl.
CPC ............ *H04R 1/1041* (2013.01); *G06F 2203/04102* (2013.01)

(58) Field of Classification Search
CPC ............ G06F 3/0487; H04R 1/1033; H04R 1/1041; H04M 1/05; H04M 1/6058
See application file for complete search history.

(56) References Cited

U.S. PATENT DOCUMENTS

| | | | |
|---|---|---|---|
| 7,388,166 | B2 | 6/2008 | Marmaropoulos |
| 8,094,673 | B2 | 1/2012 | Proctor et al. |
| 9,316,481 | B2* | 4/2016 | Lee ............ G01B 7/30 |
| 9,807,852 | B1 | 10/2017 | Starner et al. |
| 10,047,459 | B1 | 8/2018 | Starner et al. |
| 10,083,289 | B1 | 9/2018 | Starner et al. |
| 10,402,020 | B1* | 9/2019 | Starner ............ H04R 1/1041 |
| 10,727,003 | B2* | 7/2020 | Chen ............ D02G 3/04 |
| 2002/0026830 | A1* | 3/2002 | Otani ............ G01P 15/0888 73/514.32 |
| 2002/0088931 | A1* | 7/2002 | Danisch ............ D07B 1/145 250/227.14 |
| 2006/0242339 | A1 | 10/2006 | Dickson |
| 2008/0158145 | A1 | 7/2008 | Westerman |
| 2010/0315299 | A1 | 12/2010 | Bibl et al. |
| 2011/0285554 | A1 | 11/2011 | Aghaei et al. |
| 2013/0239733 | A1* | 9/2013 | Nishijima ............ B62D 1/06 74/484 R |
| 2013/0262004 | A1* | 10/2013 | Hargreaves ............ G06F 3/0446 702/64 |
| 2014/0184554 | A1 | 7/2014 | Walley |
| 2014/0277951 | A1* | 9/2014 | Kim ............ H03K 17/9622 701/48 |
| 2016/0048235 | A1 | 2/2016 | Poupyrev |
| 2016/0064156 | A1 | 3/2016 | Mirvakili et al. |
| 2016/0127050 | A1 | 5/2016 | Antoine et al. |
| 2016/0284436 | A1* | 9/2016 | Fukuhara ............ H01B 7/04 |
| 2017/0059434 | A1 | 3/2017 | Li et al. |
| 2017/0107647 | A1* | 4/2017 | Riethmuller ............ D04B 1/14 |
| 2017/0249033 | A1* | 8/2017 | Podhajny ............ G06F 3/044 |
| 2018/0049296 | A1 | 2/2018 | Starner et al. |
| 2019/0096540 | A1* | 3/2019 | Baughman ............ B29C 70/14 |

OTHER PUBLICATIONS

"Notice of Allowance", U.S. Appl. No. 15/352,411, dated Apr. 18, 2019, 9 pages.
"Notice of Allowance", U.S. Appl. No. 15/418,432, dated Sep. 12, 2018, 12 pages.
"Pre-Interview Communication", U.S. Appl. No. 15/352,411, dated Dec. 10, 2018, 6 pages.
"Pre-Interview Communication", U.S. Appl. No. 15/418,432, dated Apr. 5, 2018, 4 pages.

* cited by examiner

DETECTING TWIST INPUT WITH AN INTERACTIVE CORD

RELATED APPLICATION

This application claims priority and is a continuation of U.S. Utility patent application Ser. No. 15/352,411, filed Nov. 15, 2016, which is incorporated herein by reference in its entirety.

BACKGROUND

In-line controls for cords are standard and ubiquitous for devices such as earbuds or headphones for music players, cellular phone usage, and so forth. Similar in-line controls are also used by cords for household appliances and lighting, such as clocks, lamps, radios, fans, and so forth. Generally, such in-line controls utilize unfashionable hardware buttons attached to the cord which can break after extended use of the cord. Conventional in-line controls also have problems with intrusion due to sweat and skin, which can lead to corrosion of internal controls and electrical shorts. Further, the hardware design of in-line controls limits the overall expressiveness of the interface, in that increasing the amount of controls requires more hardware, leading to more bulk and cost.

SUMMARY

This document describes techniques and devices for detecting twist input with an interactive cord. An interactive cord includes a cable, and a fabric cover that covers the cable. The interactive cord may be implemented as a variety of different types of cords, such as a cord for headphones, earbuds, data transfer, lamps, clocks, radios, fans, and so forth. The fabric cover includes conductive yarns which are configured to enable reception of touch input that causes a change in one or more capacitance values associated with the conductive yarns. A controller, implemented at the interactive cord or a computing device coupled to the interactive cord, can detect the change in the capacitance values and trigger one or more functions associated with the change in capacitance values. For example, when implemented as a cord for a headset (e.g., headphones or ear buds), the controller can control audio to the headset, such as by playing the audio, pausing the audio, adjusting the volume of the audio, skipping ahead in the audio, skipping backwards in the audio, skipping to additional audio, and so forth.

In one or more implementations, the interactive cord is configured to detect twist input. To do so, the interactive cord may be constructed with one or more conductive yarns wrapped around the cable in a first direction (e.g., clockwise), and one or more conductive yarns wrapped around the cable in a second direction that is opposite the first direction (e.g., counter-clockwise). The controller measures one or more capacitance values associated with the conductive yarns. In response to detecting a change in the one or more capacitance values, the controller determines that the change in the capacitance values corresponds to twist input caused by the user twisting or rotating the interactive cord. In some cases, the controller can also determine the direction of the twist input (e.g., clockwise or counter-clockwise). Then, the controller initiates one or more functions based on the twist input, such as by controlling audio to a headset by increasing or decreasing the volume, scrolling through menu items, and so forth.

This summary is provided to introduce simplified concepts concerning detecting twist input with an interactive cord, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and devices for detecting twist input with an interactive cord are described with reference to the following drawings. The same numbers are used throughout the drawings to reference like features and components.

DETAILED DESCRIPTION

Overview

Figure 1:
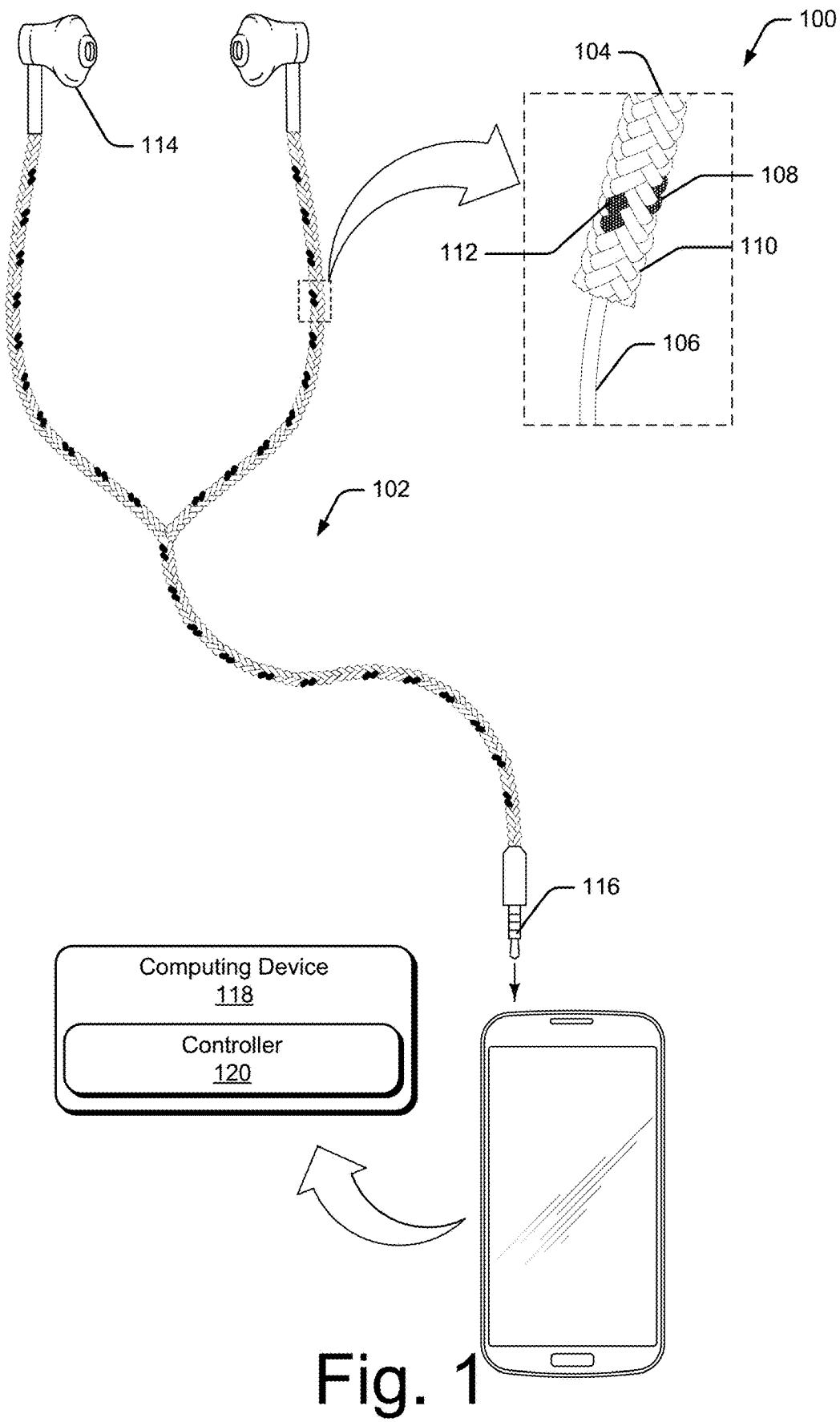
FIG. 1 is an illustration of an example environment in which techniques using, and objects including, an interactive cord may be implemented.

This document describes techniques and devices for detecting twist input with an interactive cord. An interactive cord includes a cable, and a fabric cover that covers the cable. The interactive cord may be implemented as a variety of different types of cords, such as a cord for headphones, earbuds, data transfer, lamps, clocks, radios, fans, and so forth. The fabric cover includes conductive yarns which are configured to enable reception of touch input that causes a change in one or more capacitance values associated with the conductive yarns. A controller, implemented at the interactive cord or a computing device coupled to the interactive cord, can detect the change in the capacitance values and trigger one or more functions associated with the change in capacitance values. For example, when implemented as a cord for a headset (e.g., headphones or ear buds), the controller can control audio to the headset, such as by playing the audio, pausing the audio, adjusting the volume of the audio, skipping ahead in the audio, skipping backwards in the audio, skipping to additional audio, and so forth.

Creating an interactive cord that can detect various types of touch input eliminates moving parts, hardware, bulk, unsightliness, and thickness found in existing in-line controls for cords. At the same time, the cost to manufacture the in-line controls is reduced because there are no extra hardware controls that must be electrically connected. Furthermore, the controller can be implemented to detect different types of touches to the conductive yarns (e.g., hard presses versus light taps, pinches, or combinations or sequences of touches) thereby increasing the total number of different functions that can be triggered from the interactive cord.

In order to further increase the types of touch input that can be detected, the interactive cord can be configured to detect twist input caused by the user twisting or rotating the interactive cord. To do so, the interactive cord may be constructed with one or more conductive yarns wrapped around the cable in a first direction (e.g., clockwise), and one or more conductive yarns wrapped around the cable in a second direction that is opposite the first direction (e.g., counter-clockwise). The controller measures one or more capacitance values associated with the conductive yarns. In response to detecting a change in the one or more capacitance values, the controller determines that the change in the capacitance values corresponds to twist input caused by the user twisting or rotating the interactive cord. In some cases, the controller can also determine the direction of the twist input (e.g., clockwise or counter-clockwise). Then, the controller initiates one or more functions based on the twist input, such as increasing or decreasing the volume, scrolling through menu items, and so forth. In some cases, the interactive cord can be further configured to detect slide input caused by the user sliding their fingers along the interactive cord, and distinguish the twist input from the slide input.

In one or more implementations, the interactive cord can be configured to detect twist input by constructing the cord with an inner layer comprising a cable and one or more conductive yarns wrapped around the cable in a first direction, and an outer layer comprising one or more conductive yarns wrapped around the inner layer in a second direction that is opposite the first direction. In order to detect twist input and a direction of the twist input, the controller measures a capacitance value between the conductive yarns of the inner layer and the outer layer. In response to detecting an increase in the capacitance value, the controller determines that the increase in capacitance corresponds to twist input in the same direction as the second direction of the conductive yarns of the outer layer. In contrast, in response to detecting a decrease in the capacitance value, the controller determines that the decrease in capacitance corresponds to twist input in the opposite direction as the second direction of the conductive yarns of the outer layer. As described above, the controller may then initiate different functionalities based on the detection of twist input, as well as the direction of the twist input, such as by increasing the volume if the interactive cord is twisted in a counter-clockwise direction, or decreasing the volume if the interactive cord is twisted in a clockwise direction.

Example Environment

FIG. 1 is an illustration of an example environment 100 in which techniques using, and objects including, an interactive cord may be implemented. Environment 100 includes an interactive cord 102, which is illustrated as a cord for a headset. While interactive cord 102 will be described as a cord for a headset, such as earbuds or headphones, it is to be noted that interactive cord 102 may be utilized for various different types of uses, such as cords for appliances (e.g., lamps or fans), USB cords, SATA cords, data transfer cords, power cords, or any other type of cord that is used to transfer data or media.

Figure 2:
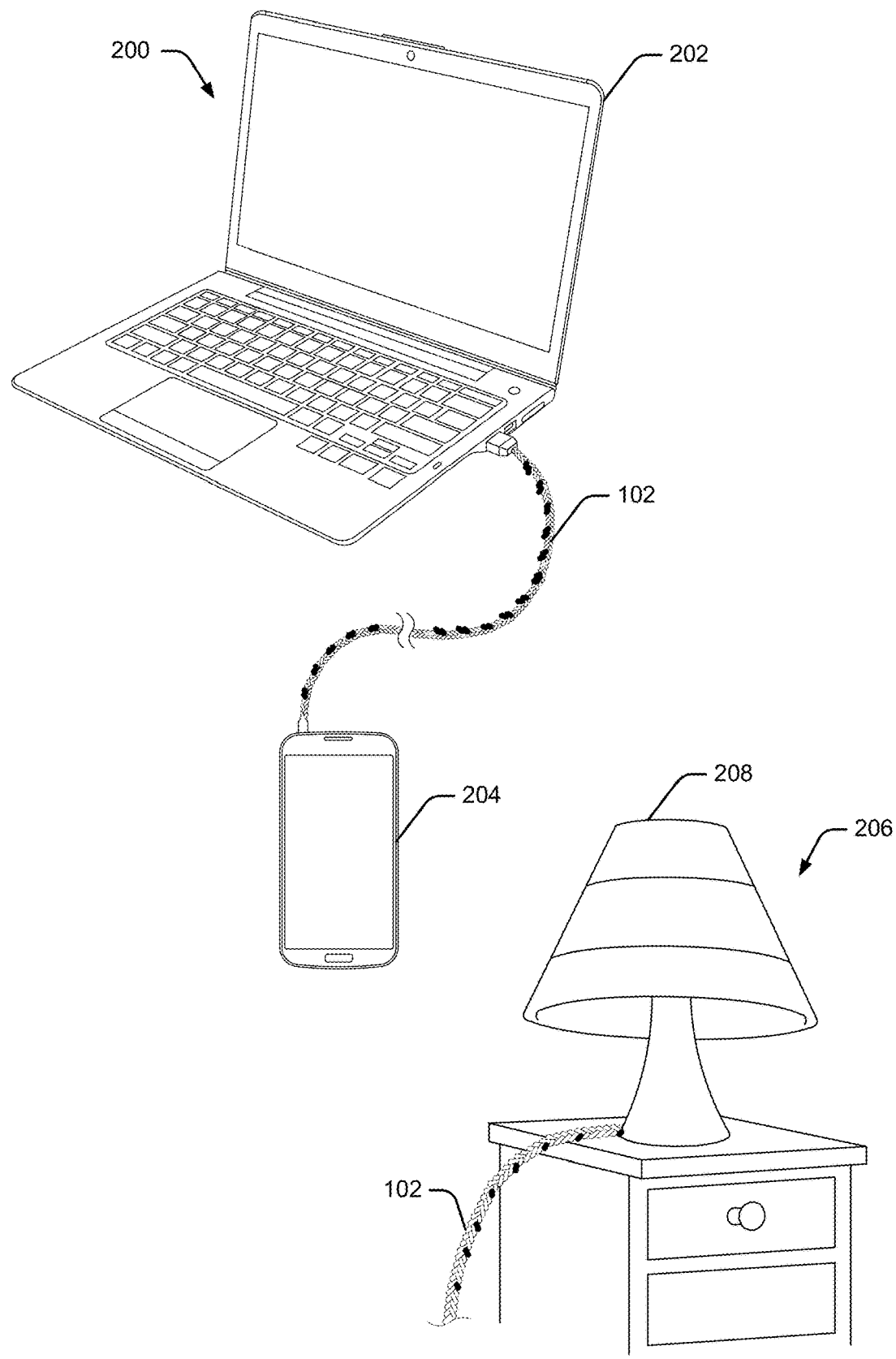
FIG. 2 illustrates additional environments in which an interactive cord may be implemented.

Consider, for example, FIG. 2 which illustrates additional environments in which interactive cord 102 can be implemented. At an environment 200, interactive cord 102 is implemented as a data transfer cord configured to transfer data (e.g., media files) between a computer 202 and a mobile device 204. In this example, interactive cord 102 may be configured to receive touch input usable to initiate the transfer, or pause the transfer, of data between computer 202 and mobile device 204.

As another example, at an environment 206, interactive cord 102 is illustrated as a power cord for a lamp 208. In this example, interactive cord 102 may be configured to receive touch input usable to turn on and off the lamp and/or to adjust the brightness of the lamp.

Returning to FIG. 1, interactive cord 102 includes a fabric cover 104 which is configured to cover a cable 106 of interactive cord 102. In FIG. 1, a cutaway shows an example of fabric cover 104 and cable 106 beneath the cover. In this example, cable 106 is configured to communicate audio data to headset. In other implementations, however, cable 106 is can be implemented to transfer power, data, and so forth.

Instead of using separate hardware controls, fabric cover 104 is configured to sense touch input using capacitive sensing. To do so, fabric cover 104 includes one or more conductive yarns 108 that are woven, braided, or otherwise integrated with the fabric of fabric cover 104. Generally, conductive yarn 108 corresponds to yarn that is flexible, but includes a wire that changes capacitance in response to human input. For example, when a finger of a user's hand approaches conductive yarn 108, the finger causes the capacitance of conductive yarn 108 to change.

Figure 3:
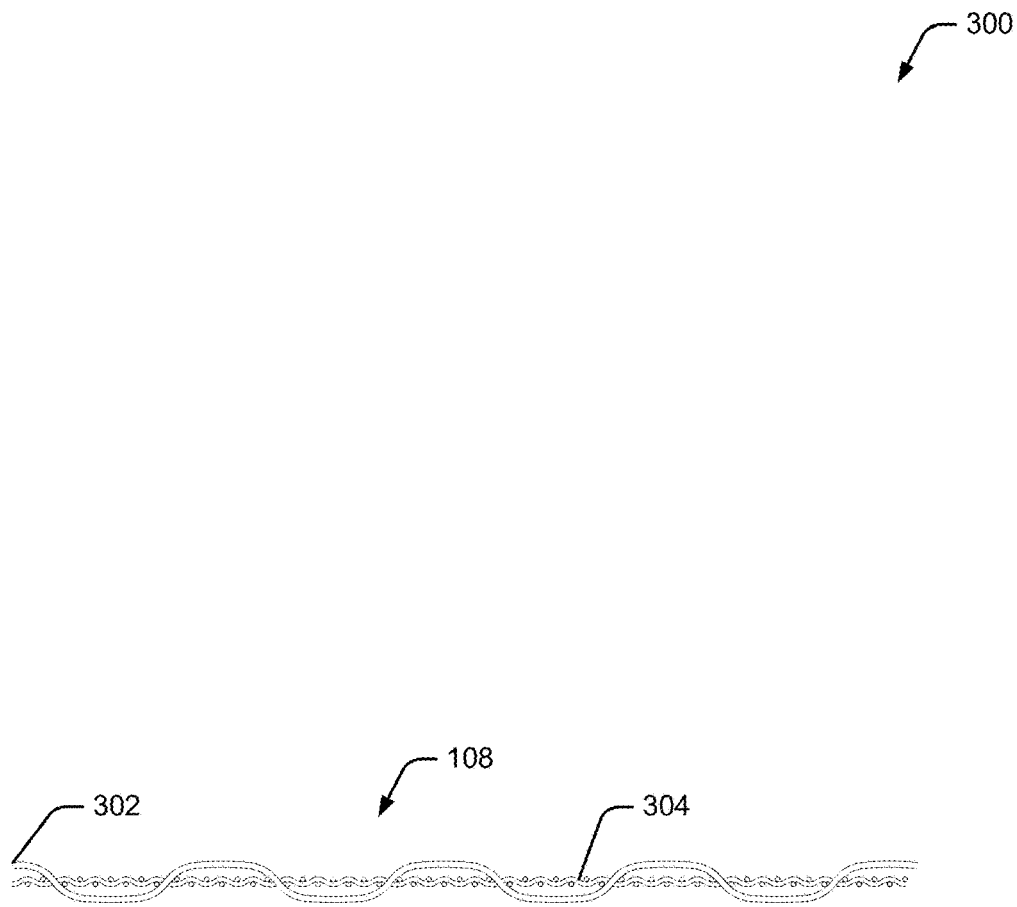
FIG. 3 illustrates an example of a conductive yarn in accordance with one or more implementations.

Consider, for example, FIG. 3 which illustrates an example 300 of conductive yarn 108 in accordance with one or more implementations. In this example, conductive yarn 108 includes a conductive wire 302 that is combined with one or more flexible yarns 304. Conductive wire 302 may be combined with flexible yarns 304 in a variety of different ways, such as by twisting flexible yarns 304 with conductive wire 302, wrapping flexible yarns 304 with conductive wire 302, braiding or weaving flexible yarns 304 to form a cover that covers conductive wire 302, and so forth. Conductive wire 302 may be implemented using a variety of different conductive materials, such as copper, silver, gold, aluminum, or other materials coated with a conductive polymer. Flexible yarn 304 may be implemented as any type of flexible yarn or fiber, such as cotton, wool, silk, nylon, polyester, and so forth.

Combining conductive wire 302 with flexible yarn 304 causes conductive yarn 108 to be flexible and stretchy, which enables conductive yarn 108 to be easily woven with one or more non-conductive yarns 110 (e.g., cotton, silk, or polyester) to form fabric cover 104. Alternately, in at least some implementations, fabric cover 104 can be formed using only conductive yarns 108.

In one or more implementations, to enable fabric cover 104 to sense touch input, the fabric cover is constructed with one or more capacitive touchpoints 112. As described herein, capacitive touchpoints 112 correspond to positions on fabric cover 104 that will cause a change in capacitance to conductive yarn 108 when a user's finger (or other conductive surface or material) touches, or comes in close contact with, capacitive touchpoint 112.

In one or more implementations, the weave or braid pattern of fabric cover 104 exposes conductive yarn 108 at the capacitive touchpoints 112. In FIG. 1, for example, conductive yarn 108 is exposed at capacitive touchpoints 112, but is otherwise not visible. In some implementations, two or more conductive yarns 108 may be substantially parallel to each other at capacitive touchpoints 112, but twisted together at other areas of fabric cover 104. The various ways in which capacitive touchpoints 112 can be integrated within fabric cover 104 are discussed in greater detail, below, with regards to FIG. 4.

Capacitive touchpoints 112 may be formed with a visual or tactile cue to enable the user to easily recognize the location of the capacitive touchpoint 112. In FIG. 1, for instance, conductive yarns 108 are shown as being a different color (black) than the non-conductive yarns 110 (white), thereby providing a visual cue to the user as to where the capacitive touchpoint is located.

In environment 100, interactive cord 102 includes earbuds 114 and a connector 116 that is configured to be plugged into a computing device 118. Computing device 118 is illustrated as a mobile phone, but may also be configured as a desktop computer, a laptop computer, a tablet device, a wearable device, and so forth. Thus, computing device 118 may range from full resource devices with substantial memory and processor resources (e.g., personal computers, game consoles) to low-resource devices with limited memory and/or processing resources (e.g., mobile devices).

Computing device 118 is illustrated as including a controller 120 which is representative of functionality to sense touch input to capacitive touchpoints 112 of interactive cord 102, and to trigger various functions based on the touch input. For example, when interactive cord 102 is implemented as a cord for a headset, controller 120 can be configured to, in response to touch input to capacitive touchpoints 112, start playback of audio to the headset, pause audio, skip to a new audio file, adjust the volume of the audio, and so forth. In FIG. 1 controller 120 is illustrated as being implemented at computing device 118, however, in alternate implementations, controller 120 may be integrated within interactive cord 102, or implemented with another device, such as powered headphones, a lamp, a clock, and so forth.

Having discussed an example environment 100 in which interactive cord 102 may be implemented, consider now a more-detailed discussion of fabric cover 104.

Fabric cover 104 may be formed in a variety of different ways. In one or more implementations, the weave or braid pattern of fabric cover 104 causes conductive yarns 108 to be exposed at capacitive touchpoints 112, but covered and hidden from view at other areas of fabric cover 104.

Figure 4:
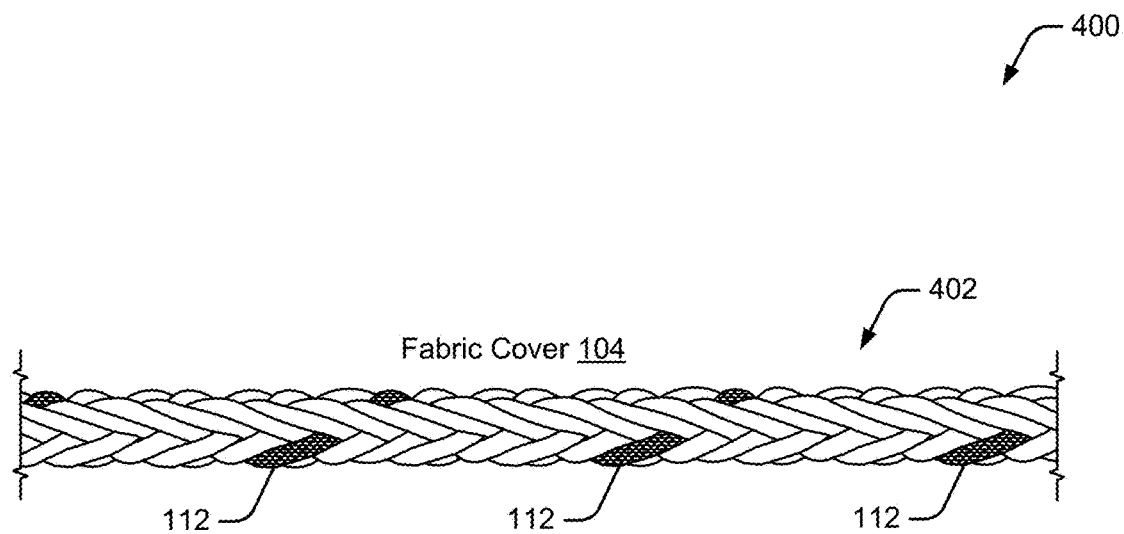
FIG. 4 illustrates examples of a fabric cover in accordance with one or more implementations.
Figure 4:
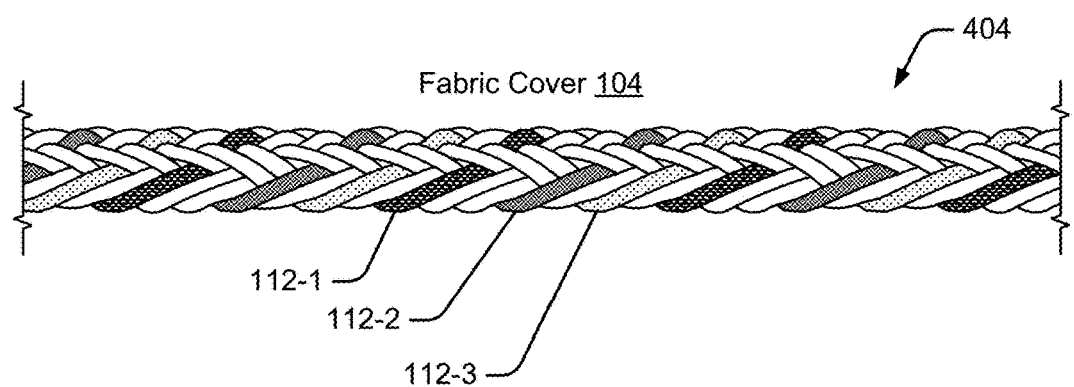

Consider, for example, FIG. 4 which illustrates examples 400 of fabric cover 104 in accordance with one or more implementations. In a first example, at 402, fabric cover 104 includes a single conductive yarn, or single set of conductive yarns 108, woven with non-conductive yarns 110, to form capacitive touchpoints 112. Notably, the one or more conductive yarns 108 correspond to a first color (black) which is different than a second color (white) of non-conductive yarns 110 woven into the fabric cover.

In this example, the weave pattern of fabric cover 104 exposes conductive yarn 108 at capacitive touchpoints 112 along fabric cover 104. However, conductive yarn 108 is covered and hidden from view at other areas of fabric cover 104. Touch input to any of capacitive touchpoints 112 causes a change in capacitance to conductive yarn 108, which may be detected by controller 120. However, touch input to other areas of fabric cover 104 formed by non-conductive yarn 110 does not cause a change in capacitance to conductive yarn 108.

In one or more implementations, fabric cover 104 includes at least a first conductive yarn 108 and a second conductive yarn 108. The first conductive yarn 108 is substantially parallel to the second conductive yarn at one or more capacitive touchpoints 112 of fabric cover 104, but twisted with second conductive yarn 108 at other areas of fabric cover 104. Capacitive touchpoints 112 are formed at the areas of fabric cover 104 at which the first and second conductive yarns are parallel to each other because bringing a finger close to capacitive touchpoints 112 will cause a difference in capacitance that can be detected by controller 120. However, in the regions where conductive yarns 108 are twisted, the closeness of the finger to conductive yarns 108 has equal effect on the capacitance of both conductive yarns 108, which avoids false triggering if the user touches the conductive yarn 108. Notably, therefore, conductive yarn 108 may not need to be covered by non-conductive yarn 110 in this implementation.

Visual cues can be formed within fabric cover 104 to provide an indication to the user as to where to touch interactive cord 102 to initiate various functions. In one or more implementations, conductive yarns 108 correspond to one or more first colors which are different than one or more second colors of non-conductive yarns 110 woven into fabric cover 104. For example, at 402, the color of conductive yarn 108 is black, whereas the remainder of the fabric cover is white, which enables the user to recognize where to touch fabric cover 104. Alternately or additionally, the one or more conductive yarns 108 can be woven into fabric cover 104 to create one or more tactile capacitive touchpoints by knitting or weaving of the yarn to create a tactile cue that can be felt by the user. For example, capacitive touchpoints 112 can be formed to protrude slightly from fabric cover 104 in a way that can be felt by the user when touching interactive cord 102.

In the example fabric cover 104 illustrated at 402, controller 120 is able to detect touch input to the various capacitive touchpoints 112. However, controller 120 may be unable to distinguish touch input to a first capacitive touchpoint 112 from touch input to a second, different, capacitive touchpoint 112. In this implementation, therefore, the number of functions that can be triggered using interactive cord 102 is limited.

However, capacitive touchpoints 112 that are electrically distinct can be made by incorporating multiple sets of conductive yarns 108 into fabric cover 104 to create multiple different capacitive touchpoints 112 which can be distinguished by controller 120. For example, fabric cover 104 may include one or more first conductive yarns 108 and one or more second conductive yarns 108. The one or more first conductive yarns 108 can be woven into fabric cover 104 such that the one or more first conductive yarns 108 are exposed at one or more first capacitive touchpoints 112, and the one or more second conductive yarns 108 can be woven into fabric cover 104 such that the one or more second conductive yarns 108 are exposed at one or more second capacitive touchpoints 112. Doing so enables controller 120 to distinguish touch input to the one or more first capacitive touchpoints 112 from touch input to the one or more second capacitive touchpoints 112.

As an example, at 404 fabric cover 104 is illustrated as including multiple electrically distinct capacitive touchpoints 112, which are visually distinguished from each other by using yarns of different colors and/or patterns. For example, a first set of conductive yarn is colored black with dots to form capacitive touchpoints 112-1, a second set of conductive yarn is gray with dots to form capacitive touchpoints 112-2, and a third set of conductive yarn is colored white with dots to form capacitive touchpoints 112-3. The weaving pattern of fabric cover 104 surfaces capacitive touchpoints 112-1, 112-2, and 112-3 at regular intervals along fabric cover 104 of interactive cord 102.

In this case, each of the different capacitive touchpoints 112-1, 112-2, and 112-3 may be associated with a different function. For example, the user may be able to touch capacitive touchpoint 112-1 to trigger a first function (e.g., playing or pausing a song), touch capacitive touchpoint 112-2 to trigger a second function (e.g., adjusting the volume of the song), and touch capacitive touchpoint 112-3 to trigger a third function (e.g., skipping to a next song).

In some cases, a combination, sequence, or pattern of touches to capacitive touchpoints 112 may trigger different functions. For example, the user may be able to touch capacitive touchpoints 112-1 and 112-2 at the same time in order to trigger a fourth function (e.g., fast forwarding the song).

Fabric cover 104 can be formed using a variety of different weaving or braiding techniques. In example 404, fabric cover 104 is formed by weaving the one or more conductive yarns into fabric cover 104 using a loop braiding technique. Doing so causes the one or more capacitive touchpoints to be formed by one or more split loops. In example 404, fabric cover 104 includes 3 different split loops, one for each of the three different types of conductive yarns to form capacitive touchpoints 112-1, 112-2, and 112-3. The split loops are placed at particular locations in the pattern to provide isolation between the conductive yarns and align them in a particular way. Doing so produces a hollow braid in mixed tabby, and 3/1 twill construction. This gives columns ("wales") along the length of the braid which exposes lengths of the different fibers. This pattern ensures that each of the conductive yarns 108 are in an isolated conductive area, which enables controller 120 to easily detect which conductive yarn 108 is being touched, and which is not, at any given time.

Audio signals are particularly vulnerable to RF interference. Thus, cords for headsets, cable TV, and other types of audio/visual wiring often contain foil or stranded wire wrapped around the signal conductors to protect the signal from radio frequency interference and to provide an electrical ground. Headset cords and other media cords also often have a woven fabric outer layer to provide some physical protection to the electrical cords, to help avoid tangling, and to improve the feel and appearance of the wires.

Thus, in one or more implementations, fabric cover 104 acts as an RF shield for cable 106, thereby reducing the need to manufacture interactive cord 102 with a separate RF shield. In addition, fabric cover 104 creates an attractive and protective covering for interactive cord 102 that also helps to prevent tangling.

Having discussed various examples of fabric cover 104, consider now a more-detailed discussion of how controller 120 detects touch input to fabric cover 104 to trigger various functions.

Generally, controller 120 is configured to monitor the one or more conductive yarns 108 of fabric cover 104 to detect a change in capacitance to conductive yarns 108 which corresponds to touch input to capacitive touchpoints 112.

Figure 5:
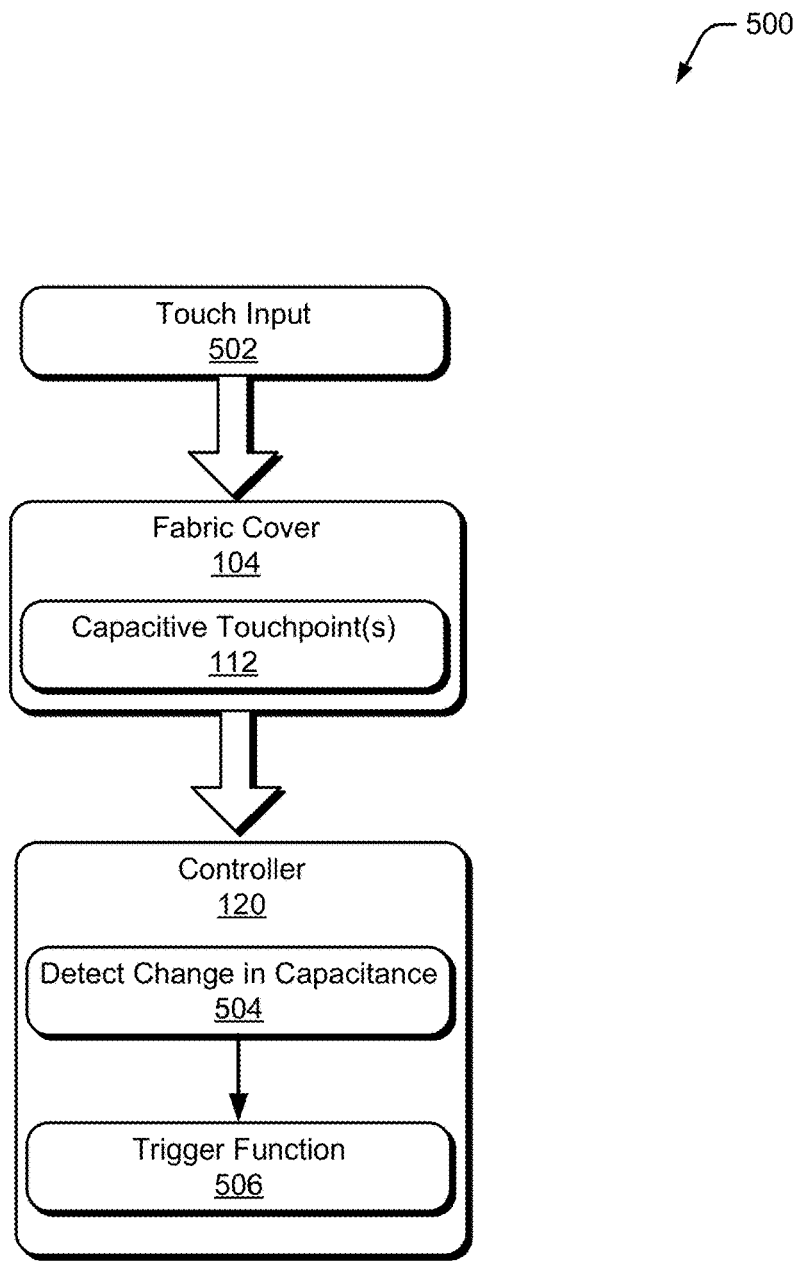
FIG. 5 illustrates an example system configured to detect touch input to a capacitive touchpoint of a fabric cover.

FIG. 5 illustrates an example system 500 configured to detect touch input to a capacitive touchpoint of a fabric cover. In system 500, touch input 502 is provided to one or more capacitive touchpoints 112 of fabric cover 104.

Figure 6:
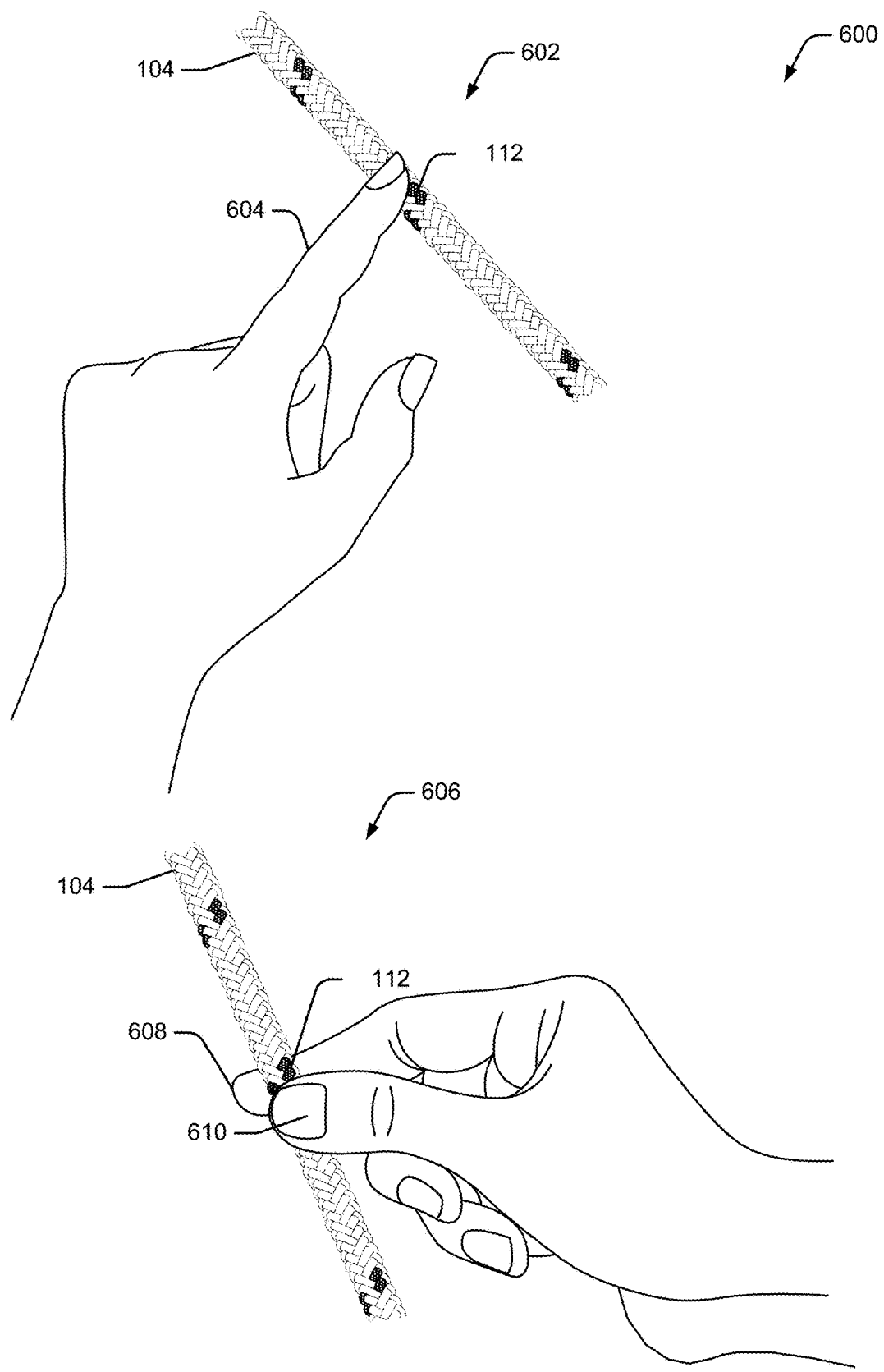
FIG. 6 illustrates examples of providing touch input to a fabric cover of an interactive cord in accordance with one or more implementations.

By way of example, consider FIG. 6, which illustrates examples 600 of providing touch input to a fabric cover of an interactive cord in accordance with one or more implementations. At 602, a finger 604 of a user's hand provides touch input by touching a capacitive touchpoint 112 of fabric cover 104 of interactive cord 102. In some cases, the touch input can be provided by moving finger 604 close to capacitive touchpoint 112 without physically touching the capacitive touchpoint.

A variety of different types of touch input 502 may be provided. In one or more implementations, touch input 502 may correspond to a pattern or series of touches to fabric cover 104, such as by touching a first capacitive touchpoint 112 followed by touching a second capacitive touchpoint 112. In one or more implementations, different types of touch input 502 may be provided based on the amount of pressure applied to capacitive touchpoint 112. As an example, at 606 an index finger 608 and a thumb 610 of the user's hand provides touch input by pinching a capacitive touchpoint 112 of fabric cover 104. Doing so may trigger a function that is different than a function triggered by simply touching or tapping capacitive touchpoint 112. In one or more implementations, a first touch to capacitive touchpoint 112 may cause the controller 120 to generate an audible alert that lets the user know that if a second tap is provided to the same capacitive touchpoint, the touch will be registered. For example, the user might tap a capacitive touchpoint 112, and in response hear a "volume up", indicating that this touchpoint is correlated to turning the volume up. The user may then then squeeze the same touchpoint in order to confirm the volume up command. In this way, the user is less likely to initiate the controls unintentionally.

Returning to FIG. 5, at 504 controller 120 detects a change in capacitance to conductive yarn 108, associated with capacitive touchpoint 112, when touch input 502 is provided to capacitive touchpoint 112 of fabric cover 104. To sense touch input 502, controller 120 may use a capacitance meter that can detect the change in capacitance of a single conductive yarn or between two conductive yarns disposed parallel to each other. Generally, when a finger touches, or comes in close contact to, capacitive touchpoint 112, a capacitance is formed between the finger and the associated conductive yarn 108. This capacitance may be detected by the capacitance meter of controller 120 to determine that the touch input has occurred.

Controller 120 may be implemented to detect the change in capacitance in a variety of different ways. In one or more implementations, controller 120 can be implemented to detect a change in capacitance between two conductive yarns 112 woven into interactive cord 102. As described above, two conductive yarns 108 can be placed parallel or interlaced to each other at capacitive touchpoints 112. In this case, one of the conductive yarns 108 can be grounded and the other conductive yarn 108 can be connected to the capacitance meter. Initially, the capacitance meter will measure a small baseline capacitance between the two conductive yarns. However, when a finger of the user's hand touches the conductive yarns at capacitive touchpoint 112, a capacitive coupling occurs with each of the conductive yarns 108. In response, the capacitance meter detects a new combined capacitance which is larger than the small baseline capacitance. This change in capacitance enables controller 120 to detect touch input 502.

In one or more implementations, controller 120 can determine the amount of pressure applied to capacitive touchpoint 112, which may enable controller 120 to distinguish a light tap from a hard press or pinch. For example, if the finger is pressed harder, or if two fingers pinch capacitive touchpoint 112, the capacitance meter will detect an even greater capacitance value. Thus, controller 120 can determine whether touch input 502 corresponds to a tap or a pinch by comparing the detected capacitance to predetermined capacitance thresholds for a touch or pinch.

In one or more implementations, controller 120 can be implemented to monitor and detect the change in capacitance of a single conductive yarn 108 woven into interactive cord 102. In this case, the single conductive yarn 108 is not grounded. When not being touched, only a small baseline capacitance exists which may be measured by the capacitance meter. When a user's finger comes in the vicinity of the conductive yarn 108, however, a touch input capacitance is formed between the fingertip and the conductive yarn. This capacitance is electrically connected in parallel to the baseline capacitance, causing the capacitance meter to detect the touch input. Similar to when the capacitance is measured between two conductive yarns, a stronger pressing will create a larger capacitance. This method may be more resistant to false touches due to moisture (e.g., rain or sweat) permeating fabric cover 104.

At 506, in response to detecting the change in capacitance, controller 120 triggers a function associated with touch input 502. Notably, controller 120 can trigger a variety of different types of functions based on the how interactive cord 102 is being utilized. For example, when interactive cord 102 corresponds to a cord for a headset, controller 120 may trigger functions such as playing audio (e.g., a song, video, audiobook file, or voice memo), pausing audio, fast forwarding audio, skipping to a next audio track, adjusting the volume of the audio, and so forth. As another example, when interactive cord corresponds to a data transfer cord, controller 120 may trigger functions such as starting the transfer of data, stopping the transfer of data, authenticating the user to enable the transfer of data, and so forth. When interactive cord 102 corresponds to a cord for an appliance (e.g., a lamp, a fan, or an alarm clock), controller 120 may trigger functions such as turning on or off the appliance, adjusting the brightness of a lamp, adjusting the speed of a fan, hitting the snooze button on an alarm clock, and so forth.

As described throughout, different functions may be mapped to different types of touch input to fabric cover 104 of interactive cord 102. In some cases, a specific function may be associated with a specific capacitive touchpoint 112. For instance, in example 404 of FIG. 4, the user may be able to touch first capacitive touchpoint 112-1 to trigger a first function (e.g., playing or pausing a song), touch second capacitive touchpoint 112-2 to trigger a second function (e.g., adjusting the volume of the song), and touch third capacitive touchpoint 112-3 to trigger a third function (e.g., skipping to a next song).

In some cases, functions may be associated with various combinations, sequences, or patterns of touch input to multiple touchpoints. For example, a function may be associated with first touching capacitive touchpoint 112-1, and then sliding the user's finger to second capacitive touchpoint 112-2.

In some cases, the function that is triggered may be based on the pressure applied to capacitive touchpoints 112. For example, a first function may be associated with tapping a capacitive touchpoint 112, and a second function may be associated with squeezing or pinching the same capacitive touchpoint.

In one or more implementations, interactive cord 102 can be used to authenticate a user. For example, rather than requiring a password to be entered into a computing device, a touch input pattern can be provided to interactive cord 102 to authenticate the user.

Figure 7:
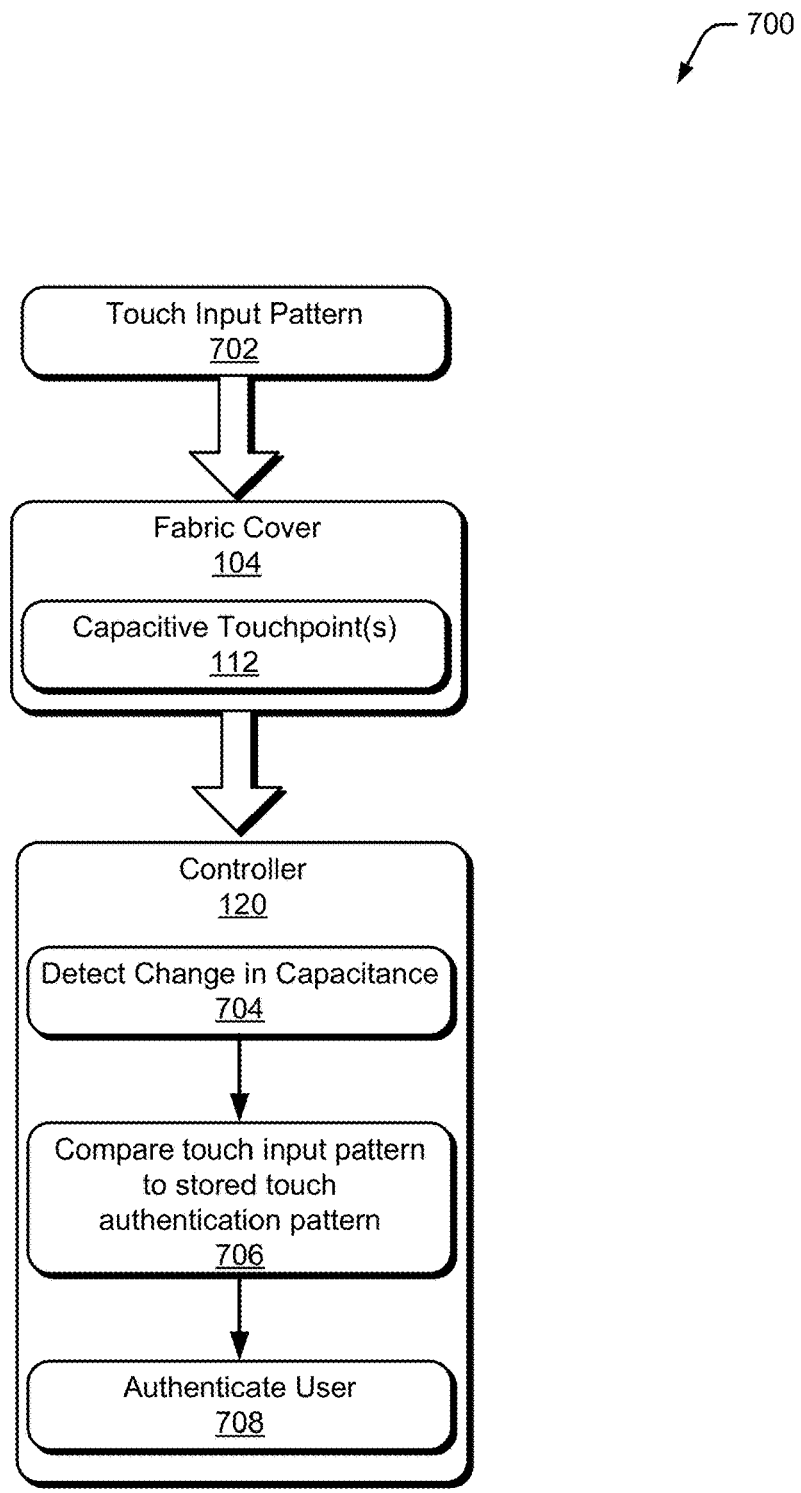
FIG. 7 illustrates an example system for using an interactive cord to authenticate a user.

Consider, for example, FIG. 7 which illustrates an example system 700 for using an interactive cord to authenticate a user. In system 700, a touch input pattern 702 is provided to one or more capacitive touchpoints 112 of fabric cover 104. For example, a finger of a user's hand can provide touch input pattern 702 by touching, or moving close to, one or more capacitive touchpoint 112 of fabric cover 104 of interactive cord 102. Touch input pattern 702 may be provided in response to a request for authentication, which may be initiated by controller 120 when interactive cord 102 is plugged in to computing device 118, or any time that computing device 118 is locked.

At 704, controller 120 recognizes the touch input pattern by detecting a change in capacitance to conductive yarn 108, associated with the one or more capacitive touchpoints 112 of fabric cover 104. Controller 120 can detect the change in capacitance using similar techniques as those described above with regards to FIGS. 5 and 6.

At 706, controller 120 compares the detected touch input pattern 702 to a stored touch authentication pattern associated with an authenticated user state, and at 708, controller 120 authenticates the user if the detected touch input pattern 702 matches the stored touch authentication pattern. For example, the user may have previously provided touch authentication pattern to controller 120 by providing touch input to fabric cover 104 of interactive cord 102. Thus, controller 120 determines whether the detected touch input pattern 702 matches the stored touch authentication pattern. If controller 120 determines a match, then the user is authenticated. In one more implementations, the user may remain authenticated until expiration of a timeout, removal of interactive cord 102 from computing device 118, or by removing interactive cord 102 from the body (e.g., removing earbuds from the user's ear).

Controller 120 is configured to recognize a variety of different types of touch input patterns 702. In one or more implementations, touch input pattern 702 includes tapping one or more capacitive touchpoints 112 with a particular rhythm. For example, the user can tap one or more capacitive touchpoints 112 with a specific rhythm, such as a rhythm corresponding to a certain beat or song.

Alternately or additionally, touch input pattern 702 may include touching absolute positions of capacitive touchpoints 112 on fabric cover 104. For example, the user can touch multiple different ones of the capacitive touchpoints in a specific sequence. In FIG. 4, for example, the user could touch capacitive touchpoint 112-2, then capacitive touchpoint 112-1, and finally capacitive touchpoint 112-3.

Alternately or additionally, touch input pattern 702 may include touching relative positions of capacitive touchpoints 112 on fabric cover 104. For example, rather than touching specific capacitive touchpoints 112, the user could touch a first capacitive touchpoint 112, then touch a second capacitive touchpoint 112 that is positioned below the first capacitive touchpoint on fabric cover 104, and then touch a third capacitive touchpoint 112 that is positioned between the first and second capacitive touchpoints 112.

Alternately or additionally, touch input pattern 702 may include applying a particular amount of pressure to the capacitive touchpoints 112 on fabric cover 104. For example, the user could apply different types of pressure to capacitive touchpoints 112, such as by pinching the capacitive touchpoint 112.

Alternately or additionally, touch input pattern 702 may include sliding from one capacitive touchpoint 112 to another capacitive touchpoint. For instance, in FIG. 4, the user could first touch capacitive touchpoint 112-1 and then slide their finger to capacitive touchpoint 112-3 along fabric cover 104.

Alternately or additionally, touch input pattern 702 may include touching multiple capacitive touchpoints 112 at substantially the same time. For example, the user could touch specific capacitive touchpoints 112 at the same. Alternately, the user could grab interactive cord 102 with a specific handgrip that would have the effect of touching multiple different capacitive touchpoints 112.

Alternately or additionally, touch input pattern 702 may include causing one capacitive touchpoint 112 to touch one or more other capacitive touchpoints 112. For example, the user could bend interactive cord 102 such that a first capacitive touchpoint 112 makes contact with a second capacitive touchpoint 112.

Notably, the aforementioned techniques for providing touch input pattern 702 may be combined in different ways for authentication based on the level of security and/or the preferences of the user.

Interactive cord 102 may be used to authenticate the user in a variety of different scenarios. When interactive cord 102 is implemented as a cord for a headset, touch input pattern 702 may be used to authenticate the user to listen to audio using the headset. For example, assume that a user of a smart phone wishes to access audio of a sensitive internal meeting. In this case, when interactive cord 102 is implemented as a cord for a headset that is plugged into the smart phone, a touch input pattern 702 can be required to log in to a secure area of the mobile phone which contains the sensitive audio. As another example, users often need to backup or copy sensitive data from one device to another. In this scenario, interactive cord 102 may be implemented as a data transfer cord that prevents unauthorized copying of data. Thus, in order to copy data from one device to another, the user would need to provide the correct touch input pattern 702 to the data transfer cord. As another example, parents often want to prevent their children from accessing stored or live media. In this scenario, the user could be unable to access certain stored or live media without providing the correct touch input pattern to interactive cord 102 of their headphones or earbuds.

Preventing False Positives

In accordance with various implementations, interactive cord 102 is configured to prevent "false positives", which may occur when the interactive cord 102 comes in contact with a human body or a conductive surface. For example, when interactive cord 102 is implemented as a cord for headphones, the interactive cord 102 may make contact with the user's neck or chest if the cord is placed under the user's shirt. In these instances, the contact of the user's skin with the touchpoints 112 of fabric cover 104 may cause a change in capacitance.

In one or more implementations, the structure of fabric cover 104 of interactive cord 102 is designed to prevent accidental contact with the capacitive touchpoints 112 by using non-conductive yarns 110 of fabric cover 104 to shield the capacitive touchpoints 112 from accidental contact. To do so, thick non-conductive yarns 112 may be braided around thinner conductive yarns 108 thereby forming ridges that shield capacitive touchpoints 112 making it virtually impossible for accidental contact. In this case, in order to provide touch input, the user can feel for the areas between these ridges in order to trigger an intentional touch to a capacitive touchpoint 112. Notably, there are a variety of different ways in which the fabric cover 104 may be formed to shield the touchpoints 112, such as by creating a spiral sheath that can protect recessed conductive touchpoints from accidental touches, creating flat braids that shield the capacitive touchpoints, and so forth.

Alternately or additionally, to prevent accidental contact from triggering a false positive, controller 120 can be implemented to distinguish intentional touch input to the touchpoints 112 from accidental contact. This can be accomplished in a variety of different ways.

In one or more implementations, the conductive yarn 108 is insulated, and thus an intentional pinch or touch on a touchpoint 112 causes a relatively large change in capacitance, whereas resting the fabric cover 104 on the user's skin causes a relatively small change in capacitance. In this case, a capacitance threshold may be calculated such that an intentional touch or pinch to a touchpoint 112 causes a change in capacitance that is greater than the capacitance threshold, whereas accidental contact with a touchpoint 112 causes a change in capacitance that is less the capacitance threshold. Controller 120 can be implemented to determine an intentional touch by detecting an amount of a change in capacitance, and comparing the amount of the change in capacitance to the capacitance threshold. If the amount of the change in capacitance is above the capacitance threshold, then controller 120 determines that the change in capacitance corresponds to an intentional touch. Alternately, if the amount of the change in capacitance is below the capacitance threshold, then controller 120 determines that the change in capacitance corresponds to accidental contact (e.g., from fabric cover 104 resting against the user's skin).

In one or more implementations, fabric cover 104 of interactive cord 102 is designed to have at least two distinct sides. For example, the fabric cover 104 may be formed as a flat braid structure with a front and back side. In this case, touchpoints 112 are surfaced on each side of fabric cover 104, and controller 120 can determine an intentional touch by detecting a change in capacitance to touchpoints 112 on each side of fabric cover 104. For example, pinching the interactive cord 102 will trigger a change in capacitance for touchpoints 112 on each side of the cord. Thus, if a change of capacitance is detected on just a single side of the interactive cord 102, controller 120 can determine that this touch corresponds to accidental contact.

In one or more implementations, controller 120 is configured to recognize an intentional touch when touch input is detected by two capacitive touchpoints 112 on immediately opposite sides of fabric cover 104 being touched simultaneously. For example, controller 120 can detect an intentional touch if a change in capacitance is detected to touchpoints 112 on the first side and second side of the fabric cover 104 within a distance threshold to each other. The distance threshold ensures that capacitive touchpoints 112 that are touched are within close proximity to each other. In this case, any other pattern of touch input (e.g., several touches on one side followed by several touches on the other side linearly separated along the length of the cord) are recognized as accidental contact, which may occur for example from a twisted cord resting against the user's skin.

Controller 120 can detect that two touch points are on immediately opposite sides of fabric cover 104 in a variety of different ways. In one or more implementations, fabric cover 104 includes multiple touchpoints. For example, as discussed above with regards to 404 of FIG. 4, fabric cover 104 may be configured with multiple electrically distinct capacitive touchpoints 112, which enables controller 120 to distinguish touch input to each of the different electrically district touchpoints 112. In this case, the multiple capacitive touchpoints 112 may be linearly arranged on a first side of the fabric cover 104 in a repeating pattern (e.g., "ABCAB-CABC"), and the multiple capacitive touchpoints 112 may be linearly arranged on a second side of the fabric cover 104 in a different repeating pattern (e.g., "CABCABCAB"). Controller 120 can detect opposing touchpoints 112 in the first position would be C and A being triggered together. If, however, A, B, and C are measuring a touch, then it is likely that accidental contact is causing the change in capacitance.

In one or more implementations, two touch circuits, e.g., A and B, may be arranged on opposite sides of the fabric cover 104. In this example, once a capacitive touch is registered on A and B, the circuits can switch to resistive sensing and attempt to determine the distance along the fabric cover at which the touches are detected. If the distances are approximately the same, then a true touch on both sides is registered. If not, then controller 120 ignores the touches, as they are likely the result of accidental contact caused by touchpoints 112 on a twisted cord lying along the skin or contact with water or metal.

As described throughout, controller 120 is configured to initiate a function associated with touched capacitive touchpoints 112 in response to determining that a touch corresponds to intentional touch input. However, if it is determined that the touch corresponds to accidental contact, controller 120 may simply ignore the accidental contact thereby reducing the number of false positives. Alternately, controller 120 may user the accidental contact as context information to determine a state of interactive cord 102. Controller 120 may then initiate one or more different functions based on the state of the interactive cord. For example, when implemented as a cord for headphones, the controller 120 may determine that the accidental contact corresponds to interactive cord 102 lying against the user's skin, and as such determine that the state of the interactive cord corresponds to the user wearing the headphones. As such, based on this determined state, controller 120 can switch the state of interactive cord 102 from a power-savings state to an active state.

Figure 8:
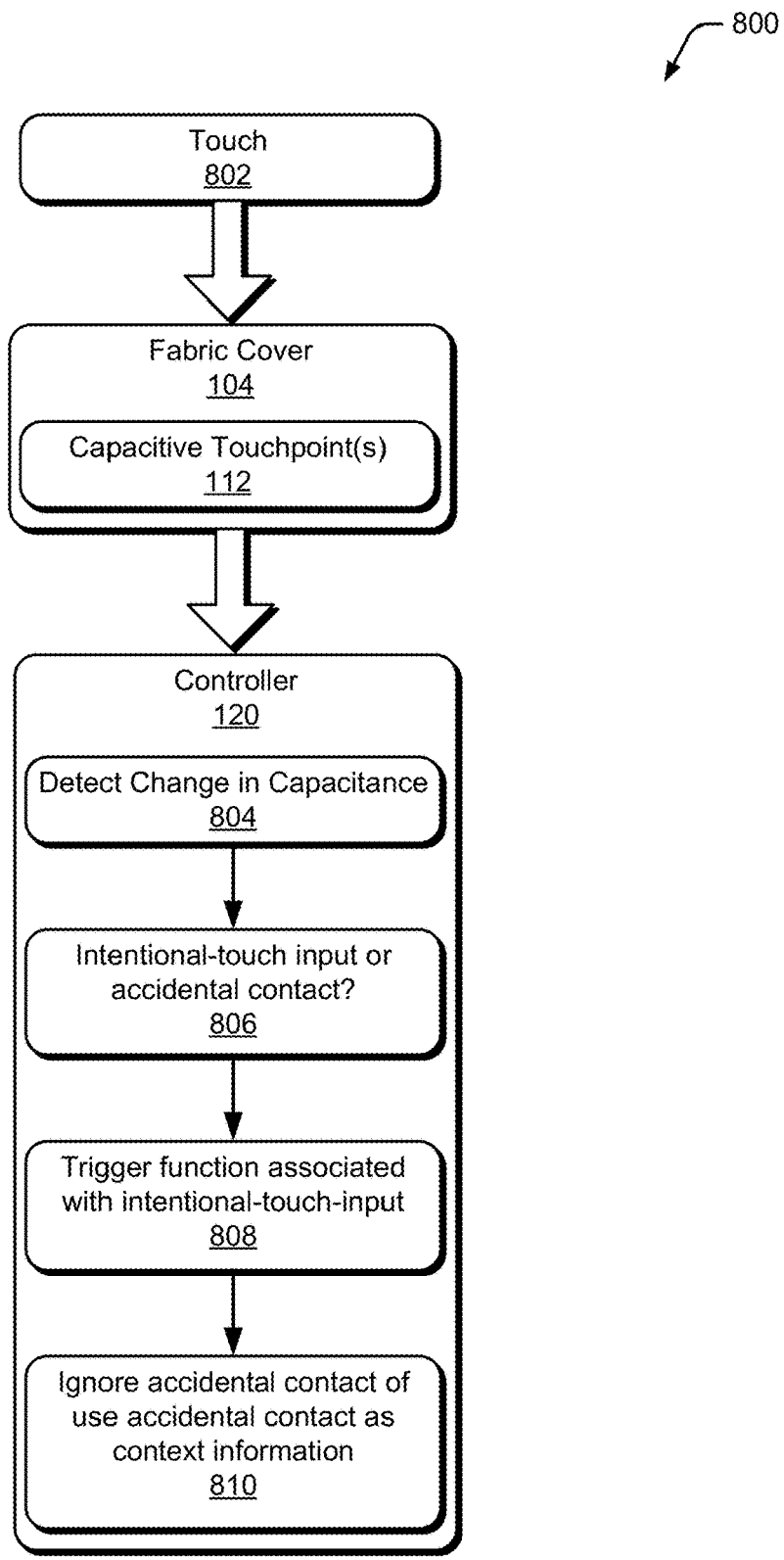
FIG. 8 illustrates an example system for distinguishing intentional touch input to the interactive cord from accidental contact

FIG. 8 illustrates an example system 800 for distinguishing intentional touch input to the interactive cord from accidental contact. In system 800, a touch 802 is provided to one or more capacitive touchpoints 112 of fabric cover 104. As described throughout out, a user may provide intentional touch input to the capacitive touchpoints 112 in a variety of different ways. However, a touch may also occur from accidental contact with the one or more capacitive touchpoints 112.

At 804 controller 120 detects a change in capacitance to conductive yarn 108, associated with one or more capacitive touchpoints 112 that are touched. As described throughout, controller 120 may detect the change in capacitance in a variety of different ways.

At 806, controller 120 determines whether the change in capacitance caused by the touch 802 corresponds to intentional touch input to the one or more capacitive touchpoints 112 or accidental contact with the one or more capacitive touchpoints 112.

At 808, if controller 120 determines that the change in capacitance corresponds to intentional touch input at 806, then controller 120 triggers a function associated with the intentional touch input. As described throughout, controller 120 can trigger a variety of different types of functions based on the how interactive cord 102 is being utilized. For example, when interactive cord 102 corresponds to a cord for a headset, controller 120 may trigger functions such as playing audio (e.g., a song, video, audiobook file, or voice memo), pausing audio, fast forwarding audio, skipping to a next audio track, adjusting the volume of the audio, and so forth. As another example, when interactive cord corresponds to a data transfer cord, controller 120 may trigger functions such as starting the transfer of data, stopping the transfer of data, authenticating the user to enable the transfer of data, and so forth. When interactive cord 102 corresponds to a cord for an appliance (e.g., a lamp, a fan, or an alarm clock), controller 120 may trigger functions such as turning on or off the appliance, adjusting the brightness of a lamp, adjusting the speed of a fan, hitting the snooze button on an alarm clock, and so forth.

Alternately, at 810, if controller 120 determines that the change in capacitance corresponds to accidental contact at 806, then controller 120 may ignore the accidental contact or use the accidental contact as context information to determine a state of the interactive cord. For example, controller 120 may determine that the accidental contact corresponds to the cord of a pair of headphones touching the user's skin, and thus switch from a power savings state to an active state.

Detecting Twist Input

In one or more implementations, controller 120 is configured to detect twist input, and in some cases slide input, to interactive cord 102. Twist input, as used herein, corresponds to input that is detected by controller 120 when the user "twists" or "rotates" interactive cord 102 between the user's fingers. Slide input, as used herein, corresponds to input that is detected by controller 120 when the user "slides" their fingers along the interactive cord 102.

Figure 9:
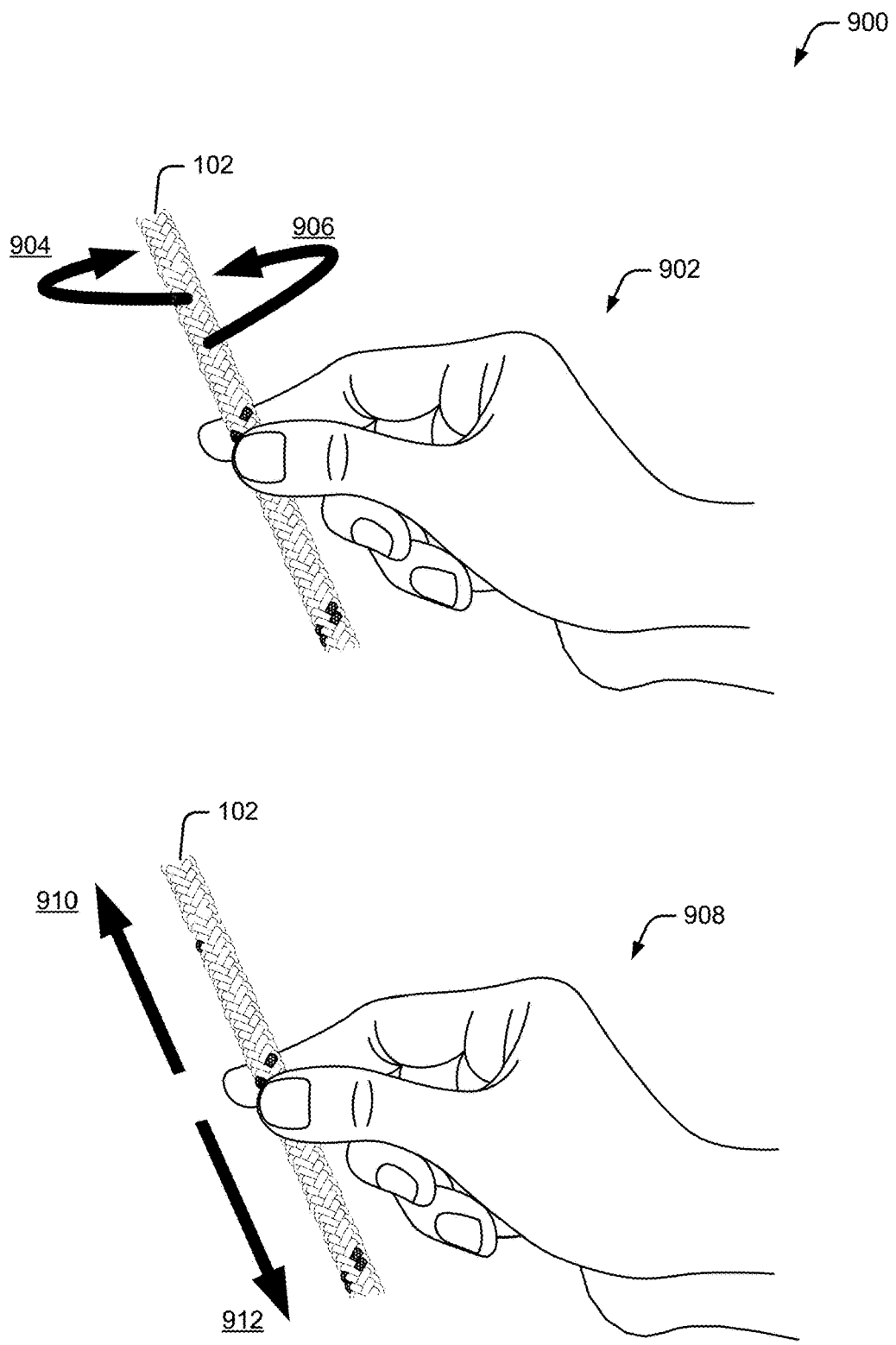
FIG. 9 illustrates examples of twist input and slide input provided to an interactive cord.

Consider, for example, FIG. 9, which illustrates examples 900 of twist input and slide input provided to interactive cord 102. At 902, a first example is illustrated in which a user provides twist input by twisting or rotating interactive cord 102 in their fingers (e.g., by rolling the interactive cord 102 between their thumb and index finger), either clockwise at 904 or counter-clockwise at 906. Controller 120 is configured to detect the twist input by detecting a change in one or more capacitance values associated with the conductive yarns 108 that are touched by the user's fingers when providing the twist input. Controller 120 may also be implemented to detect the direction of the twist input. For example, controller 120 can detect that the twist input corresponds to a first direction (e.g., clockwise in response to the user twisting the cord clockwise as shown at 904). Similarly, controller 120 can detect that the twist input corresponds to twisting or rotating the interactive cord 102 in a second direction that is opposite the first direction (e.g., counter-clockwise in response to the user twisting the interactive cord 102 counter-clockwise as shown at 906). Controller 120 may also be able to detect an amount of the twist input (e.g., a partial twist versus a full twist) and/or a speed of the twist input (e.g., a slow twist versus a quick twist).

At 908, a second example is illustrated in which a user provides slide input by sliding the user's fingers on interactive cord 102, either in the upwards direction at 910 or in the downwards direction at 912. Controller 120 is configured to detect the slide input by detecting a change in capacitance to the conductive yarns 108 that are touched by the user's fingers when providing the slide input. In one or more implementations, controller 120 can detect the direction of the slide input. For example, controller 120 can detect that the slide input corresponds to a first direction (e.g., upwards in response to the user sliding their fingers upwards on the interactive cord 102 as shown at 910). Similarly, controller 120 can detect that the slide input corresponds to a second direction (e.g., downwards in response to the user sliding their fingers downwards on the interactive cord 102 as shown at 912). In some cases, controller 120 may also be able to detect an amount of the slide input (e.g., a short slide versus a long slide) and/or a speed of the slide input (e.g., a slow slide versus a quick slide).

By enabling controller 120 to detect twist input and/or slide input, controller 120 is able to initiate a variety of different functionalities or operations. For example, controller 120 can initiate a first function (such as increasing the volume for a headset) in response to detecting twist input in a first direction, and can initiate a second function (such as decreasing the volume for the headset) in response to detecting twist input in a second direction that is opposite the first direction. Notably, controller 120 may also initiate the functionality based on the amount and/or speed of the twist input. For example, the amount that the volume is increased or decreased may be based on the amount and/or speed of the twist input.

Similarly, controller 120 can initiate a different first function (such as scrolling upwards through menu items or songs) in response to detecting slide input in a first direction, and can initiate a different second function (such as scrolling downwards through the menu items or songs) in response to detecting slide input in a second direction that is opposite the first direction. Controller 120 may initiate the functionality based on the amount and/or speed of the slide input. For example, the number of menu items that are scrolled through may be based on the amount and/or speed of the slide input.

Generally, controller 120 is able to distinguish the change in capacitance to conductive yarns 108 that is caused by twist input from the change in capacitance to the conductive yarns 108 that is caused by slide input. In some cases, in order to enable controller 120 to more easily differentiate between twist input and slide input, cover 104 of interactive cord 102 may be formed with two or more conductive yarns 108 that are wrapped around cable 104 in opposite directions (e.g., clockwise and counter-clockwise). In this way, the pattern of conductive yarns 108 or touchpoints that are touched changes in a different order based on the direction of the twist input or slide input.

Additionally, the amount and/or speed of the input can be used to differentiate twist input from slide input. For example, for twist input, the speed of the twist starts out fast, but then slows down as there is only so far that a user can twist the interactive cord due to its stiffness. In contrast, slide input may include a constant speed or an increasing speed as there is no limit on how fast the user can slide their fingers along the cord. Similarly, the amount that the user can twist an interactive cord may be different than the distance that a user can slide their fingers along the cord. Thus, in some cases, the number of different conductive yarns or touchpoints that are touched can be used to differentiate twist input from slide input.

The cover 104 of interactive cord 102 can be constructed in a variety of different ways in order to enable controller 120 to detect twist input or slide input, while still being able to detect other forms of touch input, as discussed previously. In one or more implementations, at least two conductive yarns 108 of the interactive cord 102 are wrapped (e.g., braided or weaved) around the cable 106 in a first direction (e.g., clockwise), while at least two conductive yarns 108 are rotated around the cable 106 in a second direction (e.g., counter-clockwise) which is opposite the first direction.

Figure 10:
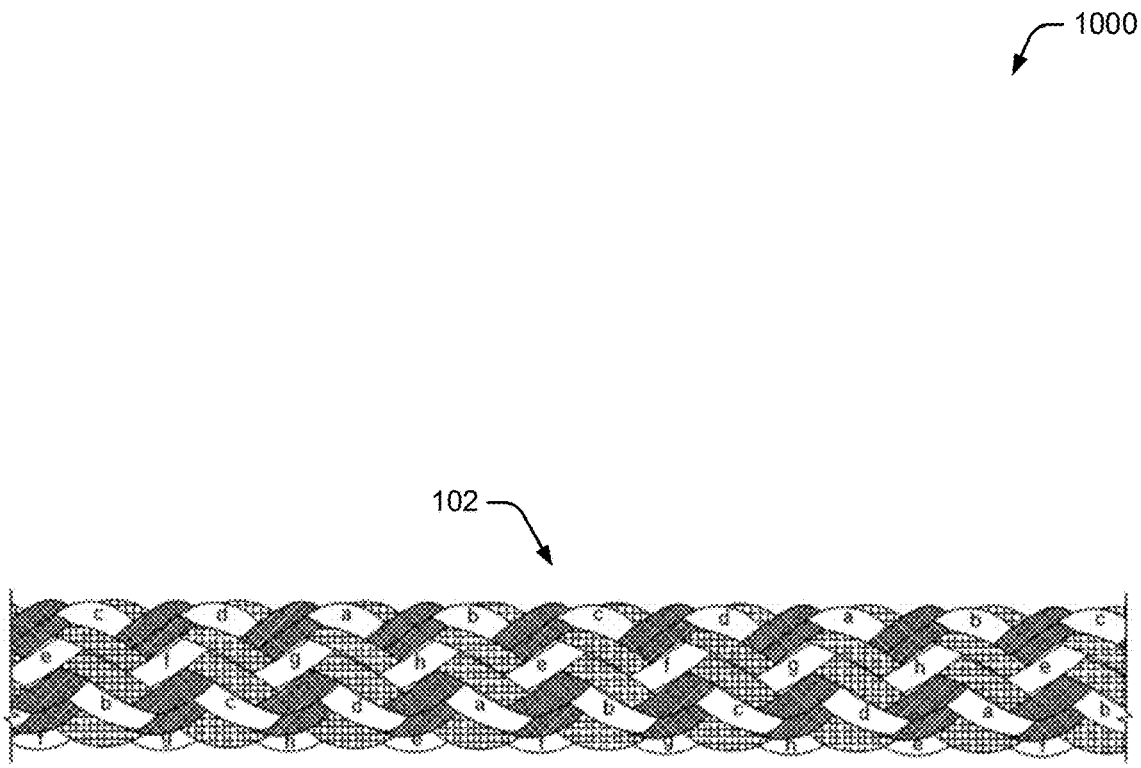
FIG. 10 illustrates an example of an interactive cord that is configured to detect twist input in accordance with one or more implementations.

As an example, consider FIG. 10, which illustrates an example 1000 of an interactive cord 102 that is configured to detect twist input in accordance with one or more implementations. In this example, the cover 104 of interactive cord 102 includes four conductive yarns (labeled "a", "b", "c", and "d") which are wrapped around the cable 106 in a first direction (e.g., counter-clockwise), and four conductive yarns labeled ("e", "f", "g", and "h") which are wrapped around the cable 106 in a second direction (e.g., clockwise). The gray patterned yarns, in this example, correspond to non-conductive yarns 110.

In this example, controller 120 is configured to detect touch input using mutual capacitance sensing. To do so, the four conductive yarns rotated around the cable 106 in the first direction (a, b, c, and d) are implemented as transmitting (Tx) lines, while the four conductive yarns rotated around the cable 106 in the second direction (e, f, g, and h) are implemented as receiving (Rx) lines for sensing, or vice versa. Doing so creates a 4×4 repeating matrix over the length of the interactive cord 102, with 16 unique sensor pairs. Notably, these techniques can be applied without loss of generality to interactive cords with 2×2 to N×N conductive yarns. For instance, if the interactive cord 102 were constructed with two conductive yarns 108 in each direction, a 2×2 repeating matrix would be created with 4 unique sensor pairs.

To detect twist input, controller 120 performs a scan using sensing hardware to collect the sensor pair values by transmitting a signal on each of the transmitting lines, one at a time, and then measuring the received signal on each of the receiving lines. When interactive cord 102 is implemented with 4 conductive yarns 108 in each direction, this generates a set of 16 sensor pair values, denoted as: [(Tx1, Rx1), (Tx1, Rx2), . . . (Tx4, Rx3), (Tx4, Rx4)], where (TxN, RxN) represents the measured change in capacitance between lines TxN and RxN. For example, in FIG. 10, these sensor pairs would be as follows: (a, e), (a, f), (a, g), (a, h), (b, e), (b, f), (b, g), (b, h), (c, e), (c, f), (c, g), (c, h), (d, e), (e, f), (e, g), (e, h).

For each transmitting line, controller 120 sorts the sensor pair values in order from highest to lowest. As an example, consider the following sorted list of sensor pair values for the Tx1 line:

(Tx1, Rx3)=1000
(Tx1, Rx2)=700
(Tx1, Rx4)=404
(Tx1, Rx1)=223

The ordering of the sensor pair values for each Tx line can be mapped to a unique order number. For example, when interactive cord 102 is implemented with four conductive yarns 108 wrapped around the cable in each direction, this means that there are exactly 24 orderings that are possible for each transmitting line. Thus, the ordering of each transmitting line may be mapped to a unique order number between 1 and 24, inclusive. For instance, in the example above, the order of the receiving lines is 3, 2, 4, 1, which could then be mapped to a unique order number.

As the user twists or rotates the interactive cord 102, the ordering of the receiving lines will change, and thus the unique order number will vary (e.g., between 1-24 for cord constructions with 4 lines in each direction). Thus, a state transition matrix can be created (24×24 in this example), where each row represents the prior state, and each column represents the current state. The matrix may be indexed as follows: state_matrix[previous][next].

This state transition matrix can be generated for each of the transmitting lines. Each entry in the state matrix is an integer value, either positive or negative, that indicates the likelihood that a state transition from "order previous" to "order next" is indicative of a rotation or twist, where positive values correspond to rotation in a first direction (e.g., clockwise) and negative values correspond to rotation in a second direction that is opposite the first direction (e.g., counter-clockwise). This state transition matrix can be constructed by hand, or it can be trained by example, by collecting state transition data as a user performs rotations in known directions, and updating the matrix according to the transitions that it records.

After performing the scan, sorting the sensor pair values, and assigning the unique order numbers, controller 120 performs a table lookup, for each transmitting line, in its associated matrix, where the indices are TxN_order_previous and TxN_order_next. Then, controller 120 adds the value found in the matrix to an accumulator which stores the sum of all state transition likelihood values over time.

Notably, the accumulator will tend towards a large positive number as the user twists the interactive cord 102 in one direction (e.g., clockwise), and will tend towards a large negative number as the user twists the interactive cord 102 in the other direction (e.g., counter-clockwise). Thus, controller 120 can determine the direction of the twist input based on the value returned by the accumulator. In other words, if a large positive number is generated by the accumulator, then controller 120 determines that twist input corresponds to a clockwise twist. Similarly, if a large negative number is generated by the accumulator, then controller 120 determines that the twist input corresponds to a counter-clockwise twist. In some cases, of course, the large positive number may be instead associated with a counter-clockwise direction, and the large positive number may be associated with the clockwise direction. Notably, the accumulator is further configured to reset itself to zero when the user has stopped interacting with interactive cord 102, which can be detected by using a threshold on the overall signal level, or through various other means.

In one or more implementations, the interactive cord 102 can be configured to detect twist input by constructing the interactive cord 102 with an inner layer comprising a cable 106 and one or more conductive yarns 108 wrapped around the cable 106 in a first direction, and an outer layer comprising one or more conductive yarns 108 wrapped around the inner layer in a second direction that is opposite the first direction.

Figure 11:
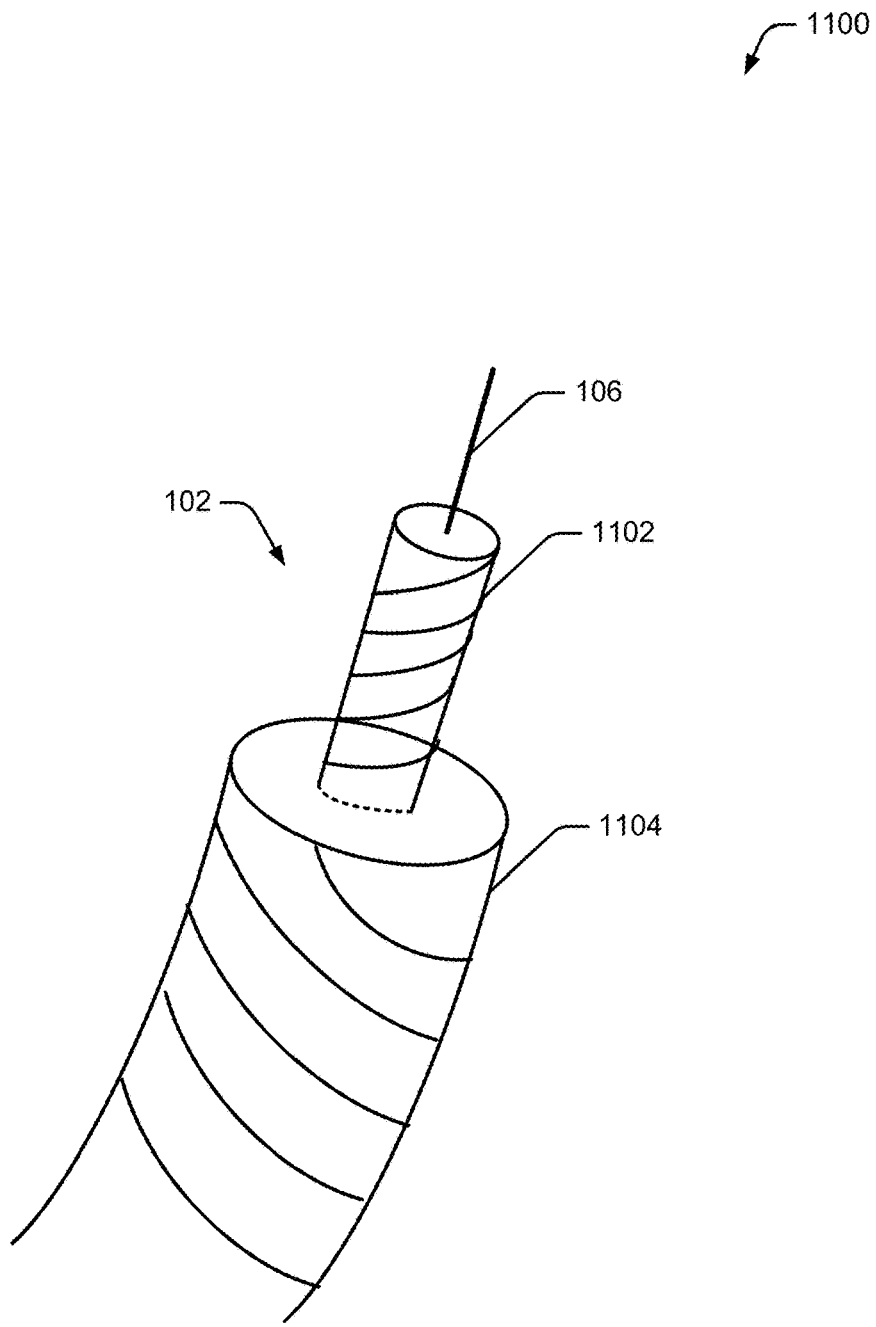
FIG. 11 illustrates an additional example of an interactive cord that is configured to detect twist input in accordance with one or more implementations.

As an example, consider FIG. 11, which illustrates an additional example 1100 of an interactive cord 102 that is configured to detect twist input in accordance with one or more implementations. In this example, a "cut-out" of the interactive cord 102 is depicted, in order to view an inner layer 1102 that includes one or more conductive yarns 108 wrapped around the cable 106 in a first direction (clockwise in this example), and an outer layer 1104 that includes one or more conductive yarns 108 wrapped around the inner layer 1102 in a second direction (counter-clockwise in this example) that is opposite the first direction.

Wrapping the conductive yarns of the inner layer 1102 and outer layer 1104 in opposite directions, causes the distance between the conductive wires 302 of respective conductive yarns 108 to increase or decrease based on the direction in which the user twists the interactive cord 102. For example, twisting the interactive cord 102 in the same direction as the second direction of the conductive yarns 108 of the outer layer 1104, causes the conductive yarns of the outer layer 1104 to tighten and the conductive yarns of the inner layer 1102 to loosen, which results in the distance between the conductive yarns of the outer and inner layer decreasing. This decrease in distance causes an increase in a capacitance value between the conductive yarns 108 of the outer layer 1104 and inner layer 1102. Similarly, twisting the interactive cord 102 in the opposite direction as the second direction of the conductive yarns 108 of the outer layer 1104, causes the conductive yarns of the outer layer 1104 to loosen and the conductive yarns of the inner layer 1102 to tighten, which results in the distance between the conductive yarns of the outer and inner layer increasing. This increase in distance causes a decrease in the capacitance value between the conductive yarns 108 of the outer layer 1104 and inner layer 1102.

Thus, in order to detect twist input and a direction of the twist input, controller 120 measures the capacitance value between the conductive yarns 108 of the inner layer 1102 and the outer layer 1104. In response to detecting an increase in the capacitance value, controller 120 determines that the increase in capacitance corresponds to twist input in the same direction as the second direction of the conductive yarns of the outer layer 1104 (clockwise in this example). In contrast, in response to detecting a decrease in the capacitance value, controller 120 determines that the decrease in capacitance corresponds to twist input in the opposite direction as the second direction of the conductive yarns of the outer layer 1104 (counter-clockwise in this example). As described above, controller 120 may then initiate different functionalities based on the detection of twist input, as well as the direction of the twist input, such as by increasing the volume if the interactive cord is twisted in a counter-clockwise direction, or decreasing the volume if the interactive cord is twisted in a clockwise direction.

Figure 12:
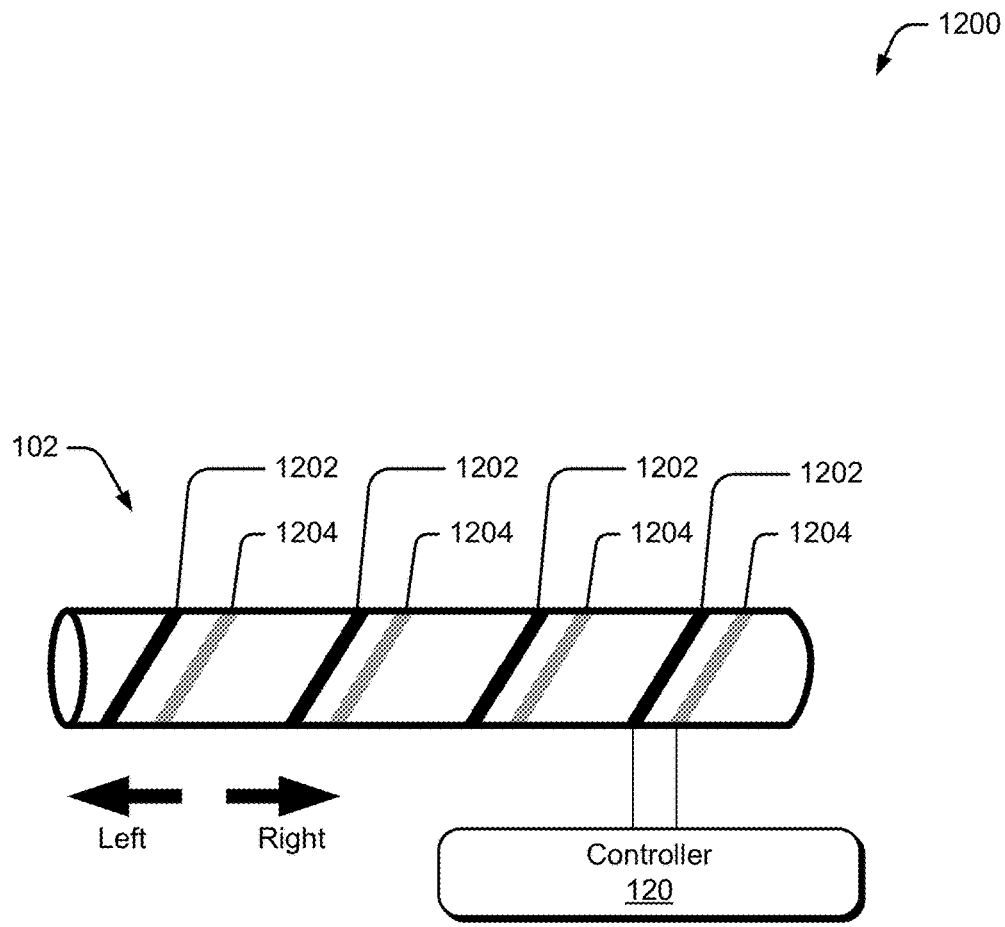
FIG. 12 illustrates an example of an interactive cord that is configured to detect slide input.

In one or more implementations, interactive cord 102 is configured to detect slide input by constructing the interactive cord with multiple conductive yarns 108 wrapped around cable 104 to form a repeating pattern. As an example, consider FIG. 12, which illustrates an example 1200 of an interactive cord 102 that is configured to detect slide input. In this example, a first conductive yarn 1202 and a second conductive yarn 1204 are wrapped around cable 104. Doing so creates a repeating pattern in the interactive cord 102 in which, when moving from left to right, first conductive yarn 1202 is always followed by second conductive yarn 1204. Similarly, when moving from right to left, second conductive yarn 1204 is always followed by first conductive yarn 1202. Notably, there is a substantial "gap" between each repeating set of the conductive yarns 1202 and 1204. It is to be appreciated, that while interactive cord 102 is illustrated with two different conductive yarns in this example, any number of conductive yarns could be used as long as the positioning of the conductive yarns follow the same repeating pattern.

In this example, controller 120 is configured to detect the signals from conductive yarns 1202 and 1204 separately. Controller 120 then determines a direction of the slide input based on the phase relationship between a first signal associated with conductive yarn 1202 and a second signal associated with conductive yarn 1202. For example, when the user's finger slides to the right in this example, the signal phase of conductive yarn 1202 always leads, or occurs before, the signal phase of conductive yarn 1204. Similarly, when the user's finger slides to the left in this example, the signal phase of conductive yarn 1204 always leads, or occurs before the signal phase of conductive yarn 1202. Thus, controller 120 determines slide input in a first direction (right in this example) in response to the first signal occurring before the second signal, and determines slide input in a second direction (left in this example) in response to the second signal occurring before the first signal.

Example Methods

FIGS. 13, 14, 15, 16, and 17 illustrate an example method 1300 (FIG. 13) of triggering a function based on touch input to a capacitive touchpoint of an interactive cord, an example method 1400 (FIG. 14) of controlling audio to a headset based on touch input to an interactive cord of the headset, an example method 1500 (FIG. 15) of authenticating a user based on a touch input pattern provided to an interactive cord, an example method 1600 (FIG. 16) of distinguishing intentional touch input to one or more capacitive touchpoints from accidental contact, and an example method 1700 (FIG. 17) of detecting twist input with an interactive cord. These methods and other methods herein are shown as sets of blocks that specify operations performed but are not necessarily limited to the order or combinations shown for performing the operations by the respective blocks. The techniques are not limited to performance by one entity or multiple entities operating on one device.

Figure 13:
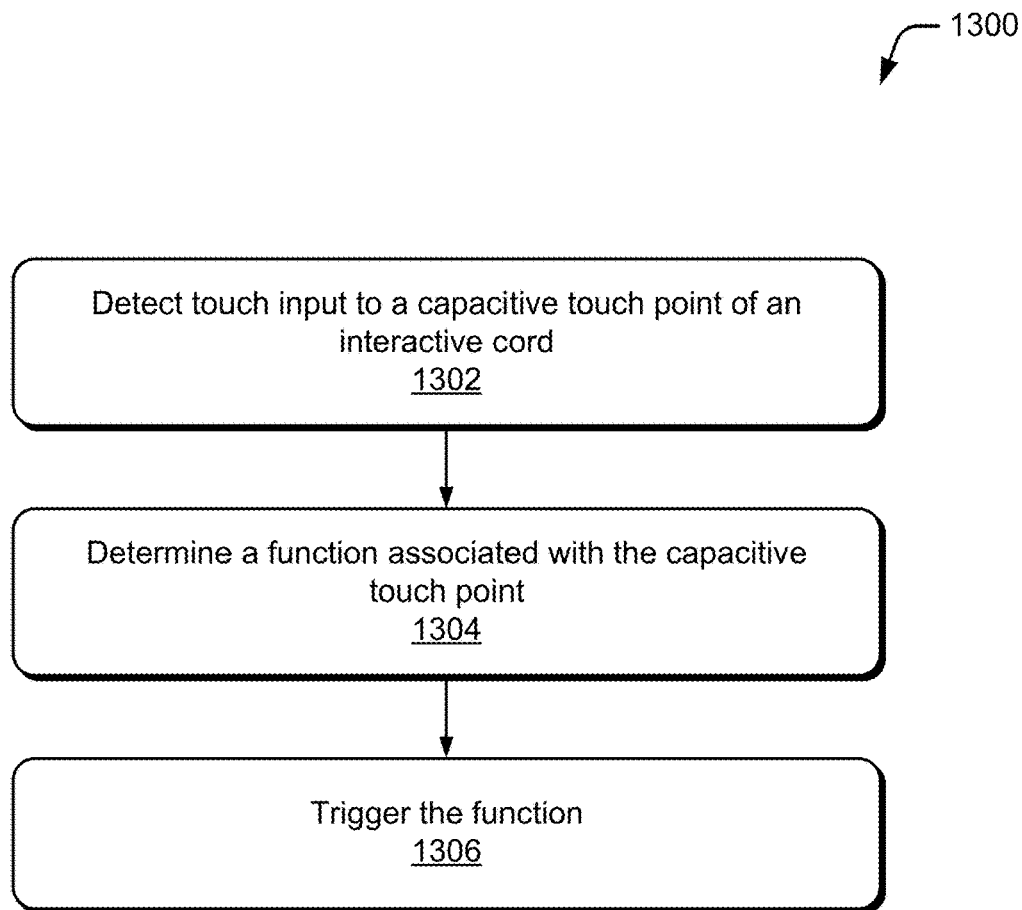
FIG. 13 illustrates an example method of triggering a function based on touch input to a capacitive touchpoint of an interactive cord.

FIG. 13 illustrates an example method 1300 of triggering a function based on touch input to a capacitive touchpoint of an interactive cord.

At 1302, touch input to a capacitive touchpoint of an interactive cord is detected. For example, controller 120 (FIG. 1) detects touch input 502 to capacitive touchpoint 112 of interactive cord 102 when an object, such as a user's finger, touches capacitive touchpoint 112.

At 1304, a function associated with the capacitive touchpoint is determined. For example, controller 120 determines a function associated with the capacitive touchpoint 112 that received the touch input at step 1302.

At 1306, the function is triggered. For example, controller 120 triggers the function determined at step 1304.

Figure 14:
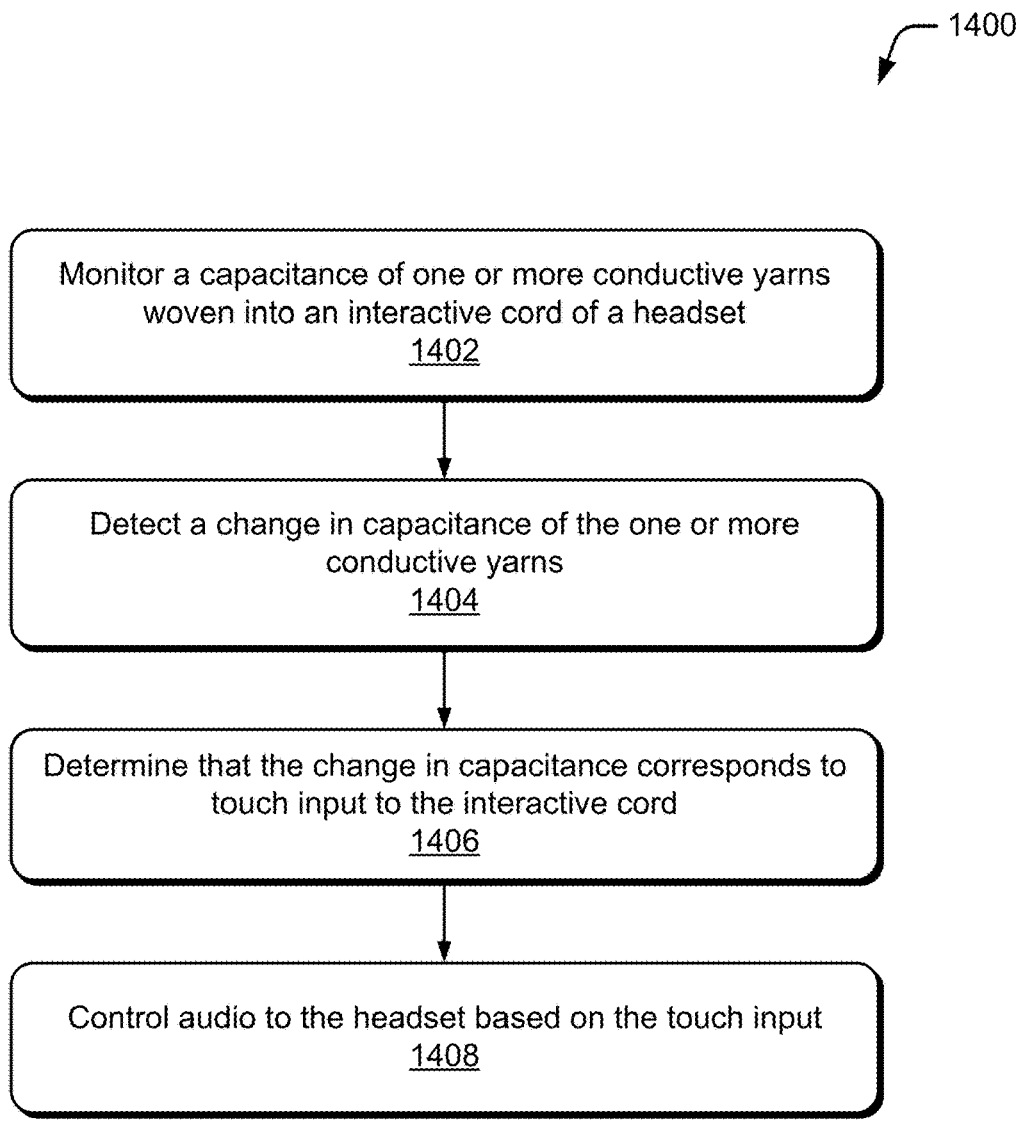
FIG. 14 illustrates an example method of controlling audio to a headset based on touch input to an interactive cord of the headset.

FIG. 14 illustrates an example method 1400 of controlling audio to a headset based on touch input to an interactive cord of the headset.

At 1402, a capacitance of one or more conductive yarns woven into an interactive cord of a headset is monitored. For example, controller 120 monitors a capacitance of one or more conductive yarns 108 woven into a fabric cover 104 of interactive cord 102.

At 1404, a change in capacitance to the one or more conductive yarns is detected. For example, controller 120 detects a change in the capacitance of the one or more conductive yarns 108.

At 1406, it is determined that the change in capacitance corresponds to touch input to the interactive cord. For example, controller 120 determines that the change in capacitance detected at step 1404 corresponds to touch input 502 to interactive cord 102. In one or more implementations, controller 120 determines that the change in capacitance corresponds to twist input or slide input.

At 1408, audio to the headset is controlled based on the touch input. For example, controller 120 controls audio to a headset based on touch input 502. For example, if touch input corresponds to twist input, controller may adjust the volume of the audio based on the direction, speed, or amount of the twist input.

Figure 15:
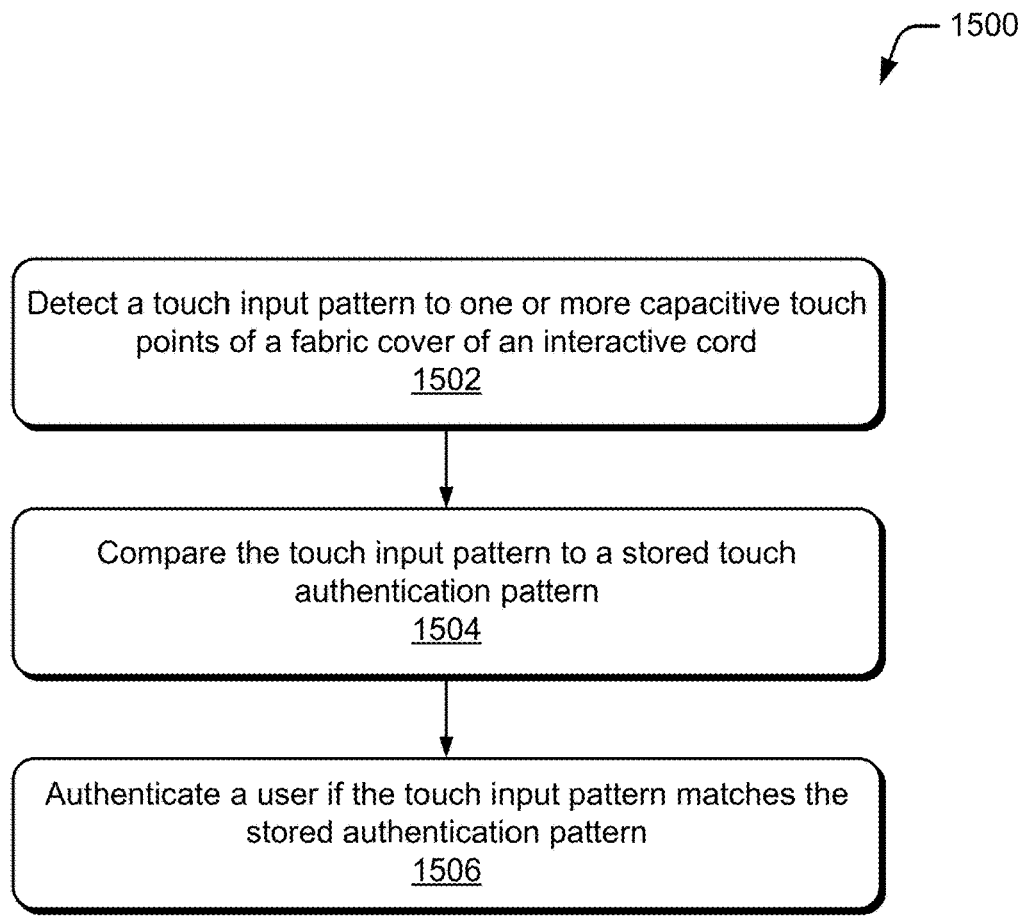
FIG. 15 illustrates an example method of authenticating a user based on a touch input pattern provided to an interactive cord.

FIG. 15 illustrates an example method 1500 of authenticating a user based on a touch input pattern provided to an interactive cord.

At 1502, a touch input pattern to one or more capacitive touchpoints of a fabric cover of an interactive cord is detected. For example, controller 120 detects touch input pattern 702 to one or more capacitive touchpoints 112 of a fabric cover 104 of interactive cord 102. A variety of different types of touch input patterns are contemplated, including by way of example and not limitation, tapping the capacitive touch points with a particular rhythm, touching absolute positions of capacitive touchpoints on the fabric cover, touching relative positions of capacitive touchpoints on the fabric cover, applying a particular amount of pressure to the capacitive touchpoints on the fabric cover, sliding from one capacitive touchpoint to another capacitive touchpoint, touching multiple capacitive touchpoints at substantially the same time, or causing one capacitive touchpoint to touch one or more other capacitive touchpoints.

At 1504, the touch input pattern is compared to a stored authentication pattern. For example controller 120 compares touch input pattern 702, detected at step 1502, to a stored touch authentication pattern. The stored touch authentication pattern may have been previously provided by the user.

At 1506, a user is authenticated if the touch input pattern matches the stored authentication pattern. For example, controller 120 authenticates the user if touch input pattern 702, detected at step 1502, matches the stored authentication pattern.

Figure 16:
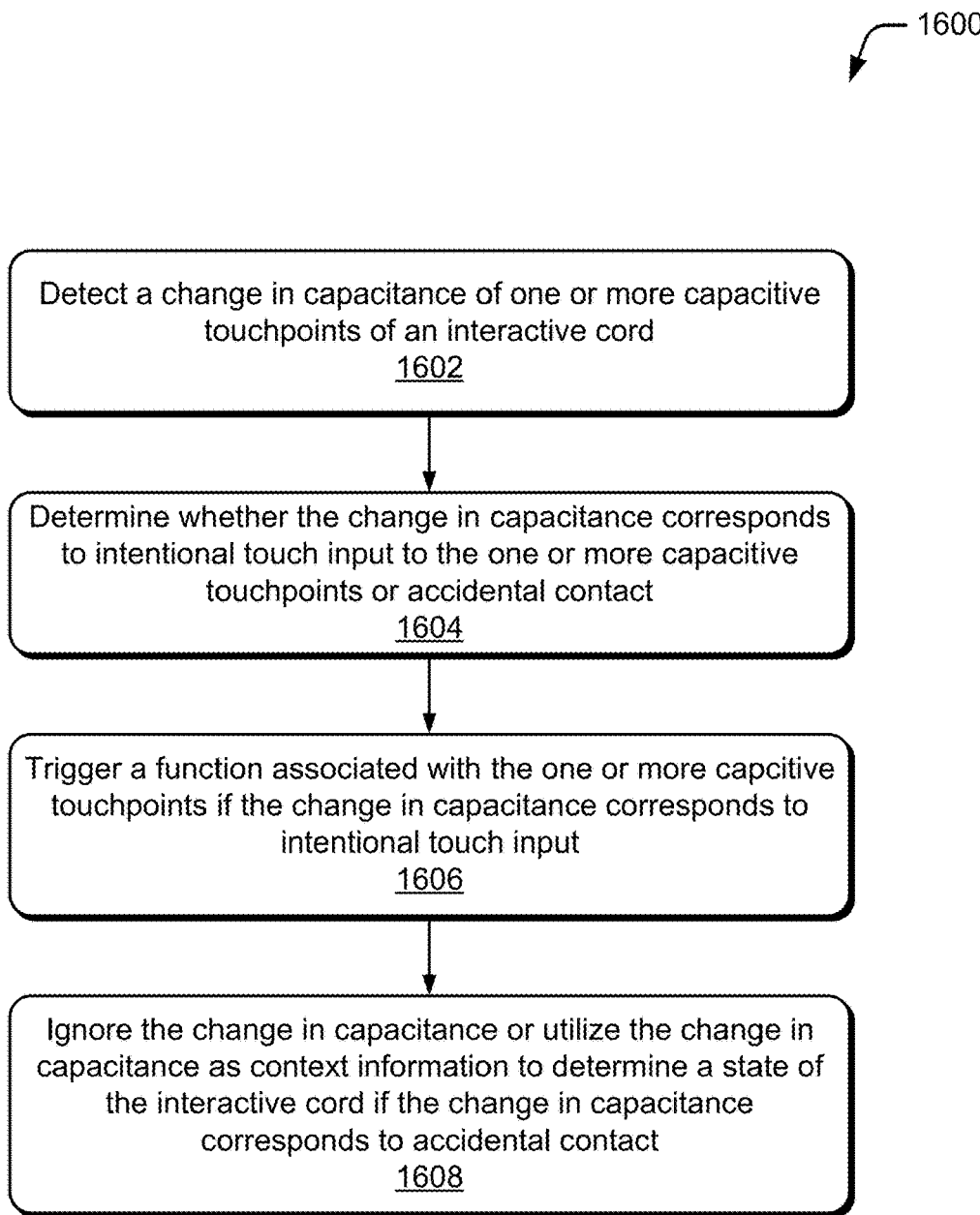
FIG. 16 illustrates an example method of distinguishing intentional touch input to one or more capacitive touchpoints from accidental contact.

FIG. 16 illustrates an example method 1500 of distinguishing intentional touch input to one or more capacitive touchpoints from accidental contact.

At 1602, a change in capacitance of one or more capacitive touchpoints of an interactive cord is detected. For example, controller 120 (FIG. 1) detects a change in capacitance to one or more capacitive touchpoints 112 of interactive cord 102.

At 1604, it is determined whether the change in capacitance corresponds to intentional touch input to the one or more capacitive touchpoints or accidental contact. For example, controller 120 determines whether the change in capacitance to the one or more capacitive touchpoints 112 corresponds to intentional touch input or accidental contact.

At 1606, if it is determined that the change in capacitance corresponds to intentional touch input, then a function associated with the one or more capacitive touchpoints is triggered. For example, controller 120 determines a function associated with the one or more capacitive touchpoints 112 that received the intentional touch input, and triggers the function.

Alternately, at 1608, if it is determined that the change in capacitance corresponds to accidental contact, then the change in capacitance of the one or more capacitive touchpoints is ignored or utilized as context information to determine a state of the interactive cord. For example, if controller 120 determines that the change in capacitance corresponds to accidental contact, then controller 120 simply ignores the accidental contact or uses the accidental contact as context information to determine a state of interactive cord 102.

Figure 17:
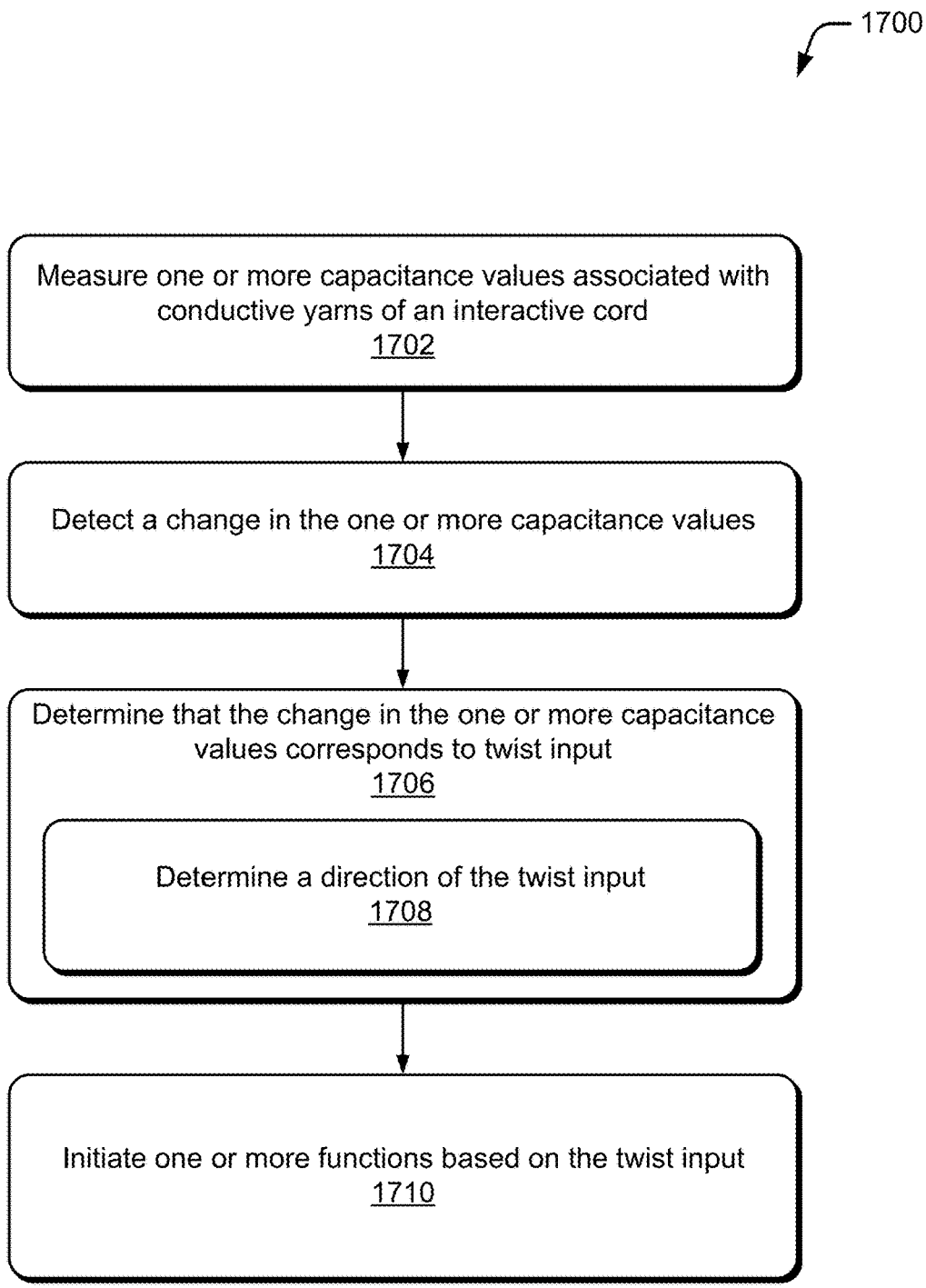
FIG. 17 illustrates an example method of detecting twist input with an interactive cord.

FIG. 17 illustrates an example method 1700 of detecting twist input with an interactive cord. At 1702, one or more capacitance values associated with conductive yarns of an interactive cord are measured. For example, controller 120 (FIG. 1) measures one or more capacitance values associated with conductive yarns 108 of interactive cord 102. Examples of interactive cords 102 that are configured to detect twist input include, by way of example and not limitation, the interactive cords 102 illustrated in FIGS. 9 and 11.

At 1704, a change in the one or more capacitance values are detected. For example, controller 120 detects a change in the one or more capacitance values associated with conductive yarns 108 of interactive cord 102.

At 1706, it is determined whether the change in the one or more capacitance values corresponds to twist input to the conductive yarns of the interactive cord 102. For example, controller 120 determines whether the change in the one or more capacitance values associated with conductive yarns 108 corresponds to twist input to interactive cord 102. Optionally, at step 1708, a direction of the twist input may also be determined. For example, controller 120 determines a direction of the twist input (e.g., clockwise or counter-clockwise).

At 1710, one or more functions are initiated based on the twist input. For example, controller 120 initiates one or more functions that are associated or otherwise mapped to the twist input, such as increasing or decreasing volume to a headset, scrolling through menu items, and so forth. In some cases, the one or more functions are initiated based at least in part on the direction of the twist input, a speed of the twist input, and/or an amount of the twist input.

Example Computing System

Figure 18:
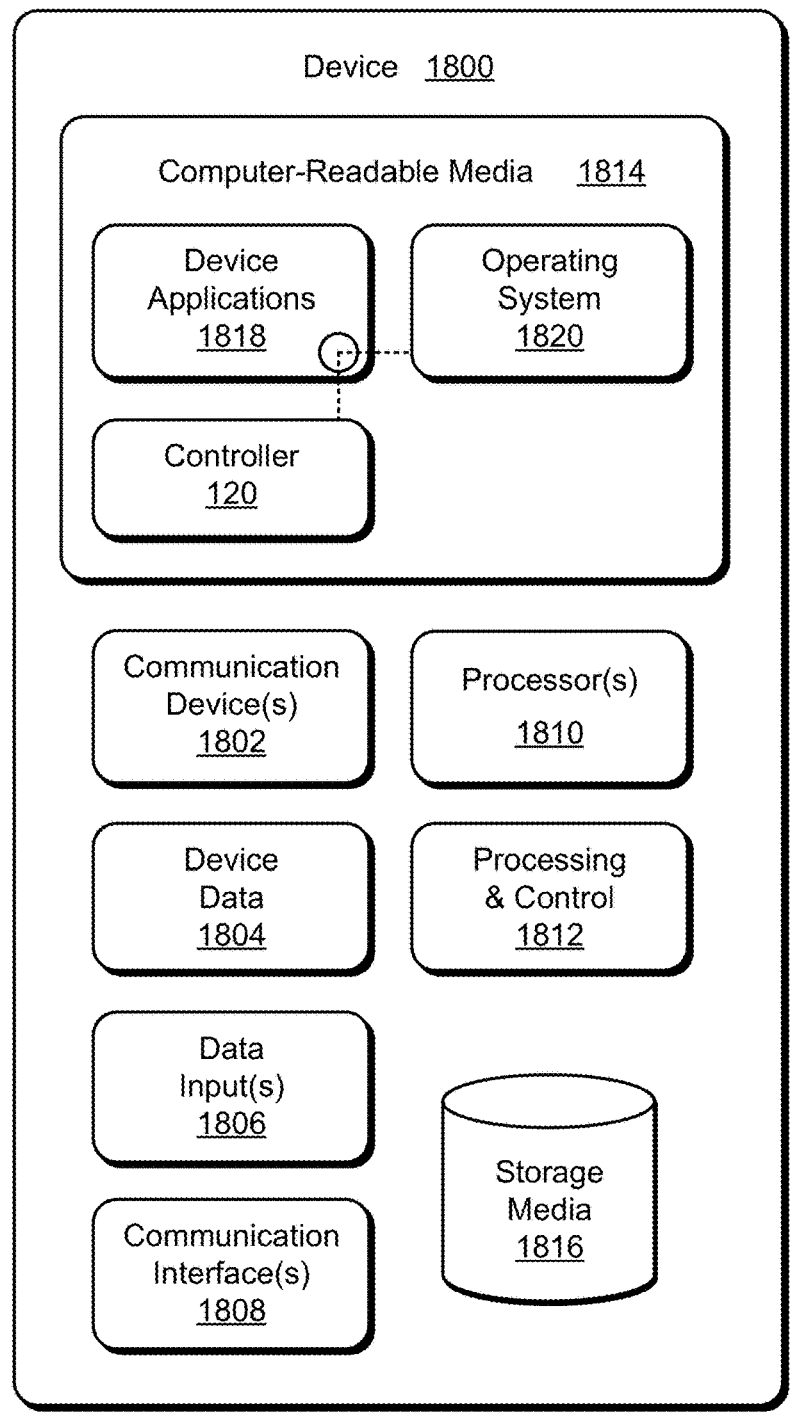
FIG. 18 illustrates various components of an example computing system that can be implemented as any type of client, server, and/or computing device as described with reference to the previous FIGS. 1-17 to implement detecting twist input with an interactive cord.

FIG. 18 illustrates various components of an example computing system 1800 that can be implemented as any type of client, server, and/or computing device as described with reference to the previous FIGS. 1-17 to implement detecting twist input with an interactive cord. In embodiments, computing system 1800 can be implemented as one or a combination of a wired and/or wireless wearable device, System-on-Chip (SoC), and/or as another type of device or portion thereof. Computing system 1800 may also be associated with a user (e.g., a person) and/or an entity that operates the device such that a device describes logical devices that include users, software, firmware, and/or a combination of devices.

Computing system 1800 includes communication devices 1802 that enable wired and/or wireless communication of device data 1804 (e.g., received data, data that is being received, data scheduled for broadcast, data packets of the data, etc.). Device data 1804 or other device content can include configuration settings of the device, media content stored on the device, and/or information associated with a user of the device. Media content stored on computing system 1800 can include any type of audio, video, and/or image data. Computing system 1800 includes one or more data inputs 1806 via which any type of data, media content, and/or inputs can be received, such as human utterances, touch data generated by interactive cord 102, user-selectable inputs (explicit or implicit), messages, music, television media content, recorded video content, and any other type of audio, video, and/or image data received from any content and/or data source.

Computing system 1800 also includes communication interfaces 1808, which can be implemented as any one or more of a serial and/or parallel interface, a wireless interface, any type of network interface, a modem, and as any other type of communication interface. Communication interfaces 1808 provide a connection and/or communication links between computing system 1800 and a communication network by which other electronic, computing, and communication devices communicate data with computing system 1800.

Computing system 1800 includes one or more processors 1810 (e.g., any of microprocessors, controllers, and the like), which process various computer-executable instructions to control the operation of computing system 1800 and to enable techniques for, or in which can be embodied, interactive cord. Alternatively or in addition, computing system 1800 can be implemented with any one or combination of hardware, firmware, or fixed logic circuitry that is implemented in connection with processing and control circuits which are generally identified at 1812. Although not shown, computing system 1800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Computing system 1800 also includes computer-readable media 1814, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Computing system 1800 can also include a mass storage media device 1816.

Computer-readable media 1814 provides data storage mechanisms to store device data 1804, as well as various device applications 1818 and any other types of information and/or data related to operational aspects of computing system 1800. For example, an operating system 1820 can be maintained as a computer application with computer-readable media 1814 and executed on processors 1810. Device applications 1818 may include a device manager, such as any form of a control application, software application, signal-processing and control module, code that is native to a particular device, a hardware abstraction layer for a particular device, and so on.

Device applications 1818 also include any system components, engines, or managers to implement interactive cord. In this example, device applications 1818 include controller 120.

CONCLUSION

Although embodiments of detecting twist input with an interactive cord have been described in language specific to features and/or methods, it is to be understood that the subject of the appended claims is not necessarily limited to the specific features or methods described. Rather, the specific features and methods are disclosed as example implementations of detecting twist input with an interactive cord.

What is claimed is:

1. A system comprising:
an interactive cord, the interactive cord comprising:
an inner layer comprising a cable and a first set of conductive yarns wrapped around the cable in a first direction and an outer layer comprising a second set of conductive yarns wrapped around the inner layer in a second direction that is opposite the first direction, wherein twisting the interactive cord in an opposite direction from the second direction causes a distance between the first set of conductive yarns and the second set of conductive yarns to increase thereby decreasing a capacitance; and
a controller coupled to the interactive cord, the controller configured to:
measure a change in the capacitance, the change in the capacitance resulting from a twist input received at the interactive cord;
determine that a direction of the twist input is the opposite direction from the second direction based on a decrease in the capacitance; and
initiate a function in response to the determination that the direction of the twist input is the opposite direction from the second direction.

2. The system of claim 1, wherein the first set of conductive yarns is braided as part of a first cover that is included in the inner layer.

3. The system of claim 1, wherein the second set of conductive yarns is braided as part of a second cover that is included in an outer layer.

4. A system comprising:
an interactive cord, the interactive cord comprising:
an inner layer comprising a cable and a first set of conductive yarns wrapped around the cable in a first direction and an outer layer comprising a second set of conductive yarns wrapped around the inner layer in a second direction that is opposite the first direction, wherein twisting the interactive cord in a same direction as the second direction causes a distance between the first set of conductive yarns and the second set of conductive yarns to decrease thereby increasing a capacitance; and
a controller coupled to the interactive cord, the controller configured to:
measure an increase in the capacitance, the increase in the capacitance resulting from a twist input received at the interactive cord;
determine that a direction of the twist input is the same direction as the second direction based on an increase in the capacitance; and
initiate a function in response to the determination that the direction of the twist input is the same direction as the second direction.

5. The system of claim 4, wherein the first set of conductive yarns is braided as part of a first cover that is included in the inner layer.

6. The system of claim 5, wherein the second set of conductive yarns is braided as part of a second cover that is included in the outer layer.

7. The system of claim 4, wherein the function increases or decreases an amount of volume of a media player.

8. The system of claim 4, wherein the function scrolls through a list of menu items.

9. The system of claim 4, wherein the controller is further configured to determine an amount of the twist input or a speed of the twist input, and wherein the controller initiates the function based, at least in part, on the determined amount of the twist input or the determined speed of the twist input.

10. The system of claim 4, wherein the system is a headset, a tablet, or a wearable device.

11. A method implemented by a controller coupled to an interactive cord that includes a cable and a first set of conductive yarns configured as transmitting lines that are wrapped around the cable in a first direction and a second set of conductive yarns that are wrapped around the cable in a second direction, wherein twisting the interactive cord in a direction that is opposite the second direction causes a distance between the first set of conductive yarns and the second set of conductive yarns to increase thereby decreasing a capacitance, the method comprising:
measuring a decrease in the capacitance, the decrease in the capacitance resulting from a twist input received at the interactive cord;
determining that a direction of the twist input is the direction that is opposite the second direction based on the decrease in the capacitance; and
initiating a function in response to determining that the direction of the twist input is the direction that is opposite the second direction.

12. The method of claim 11, wherein the measuring the decrease in the capacitance resulting from the twist input is based on mutual capacitance sensing between the first set of conductive yarns and the second set of conductive yarns.

13. The method of claim 11, wherein initiating the function in response to the determining that the direction of the twist input is the direction that is opposite the second direction is based on an amount or speed of the twist input.

14. The method of claim 11, wherein the determining that the direction of the twist input is the direction that is opposite the second direction based on the decrease in the capacitance is a clockwise twist input.

15. The method of claim 11, wherein initiating the function initiates a command to adjust a speed of a fan, a volume of audio, or a brightness of a lamp.

16. The method of claim 11, further comprising measuring a second decrease in the capacitance, the decrease being of at least of a predetermined amount, and determining, based on the decrease being at of the least the predetermined amount, that the second decrease in the capacitance corresponds to a slide input to the interactive cord.

17. The method of claim 16, further comprises initiating an additional function based on the slide input.

18. The method of claim 17, wherein the initiating the additional function based on the slide input initiates a command to start data transfer.

19. The method of claim 11, further comprising:
- registering at least one capacitive touch on the interactive cord, the registering of the at least one capacitive touch including a first capacitive touch and a second capacitive touch; and
- configuring circuitry to switch from a capacitive sensing to a resistive sensing, the circuitry including the first set of conductive yarns and the second set of conductive yarns.

20. The method of claim 19, wherein configuring circuitry to switch from the capacitive sensing to the resistive sensing enables the controller to determine a distance along the interactive cord at which the first capacitive touch and the second capacitive touch are located, the determination usable to reduce inaccurate determination of the decrease in the capacitance.

\* \* \* \* \*